(12) United States Patent
Hornung et al.

(10) Patent No.: US 11,429,529 B2
(45) Date of Patent: Aug. 30, 2022

(54) PREFETCHING BASED ON DETECTION OF INTERLEAVED CONSTANT STRIDE SEQUENCES OF ADDRESSES WITHIN A SEQUENCE OF DEMAND TARGET ADDRESSES

(71) Applicant: Arm Limited, Cambridge (GB)

(72) Inventors: Alexander Alfred Hornung, Cambridge (GB); Jose Gonzalez-Gonzalez, Cambridge (GB); Gregory Andrew Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 72 days.

(21) Appl. No.: 16/690,506

(22) Filed: Nov. 21, 2019

(65) Prior Publication Data
US 2021/0157730 A1 May 27, 2021

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC .................................................. G06F 12/0862
See application file for complete search history.

(56) References Cited

U.S. PATENT DOCUMENTS

| | | | | |
|---|---|---|---|---|
| 6,311,260 B1* | 10/2001 | Stone | ...................... | G06F 9/383 |
| | | | | 711/137 |
| 7,681,188 B1* | 3/2010 | Tirumalai | ............... | G06F 8/445 |
| | | | | 717/161 |
| 2009/0198907 A1* | 8/2009 | Speight | ............... | G06F 12/0862 |
| | | | | 711/137 |
| 2014/0359221 A1* | 12/2014 | Kalamatianos | ..... | G06F 12/0811 |
| | | | | 711/122 |
| 2016/0350225 A1* | 12/2016 | Podaima | ............... | G06F 12/109 |
| 2017/0010970 A1* | 1/2017 | Chou | .................. | G06F 12/0862 |
| 2017/0162179 A1* | 6/2017 | Bogusz | .................. | G09G 5/397 |
| 2017/0371790 A1* | 12/2017 | Dwiel | ................. | G06F 12/0811 |

OTHER PUBLICATIONS

Kim et al., "Lookahead Prefetching with Signature Path", The 2nd Data Prefetching Championship (DPC2) (2015), 4 pages.

* cited by examiner

*Primary Examiner* — William E. Baughman
*Assistant Examiner* — Janice M. Girouard
(74) *Attorney, Agent, or Firm* — Nixon & Vanderhye P.C.

(57) ABSTRACT

An apparatus comprises processing circuitry to issue demand memory access requests to access data stored in a memory system. Stride pattern detection circuitry detects whether a sequence of demand target addresses specified by the demand memory access requests includes two or more constant stride sequences of addresses interleaved within the sequence of demand target addresses. Each constant stride sequence comprises addresses separated by intervals of a constant stride value. Prefetch control circuitry controls issuing of prefetch load requests to prefetch data from the memory system. The prefetch load requests specify prefetch target addresses predicted based on the constant stride sequences detected by the stride pattern detection circuitry.

17 Claims, 12 Drawing Sheets

A)

| Address | (Y)oung | (O)ld | (R)andom | (P)refetch candidate | Stream Head |
|---|---|---|---|---|---|
| 0 | - | - | - | - | False |
| 1 | +1, 1 | +1, 1 | +1, 1 | - | False |
| 3 | +2, 1 | +3, 1 | +2, 1 | - | False |

B)

| Address | (Y)oung | (O)ld | (R)andom | (P)refetch candidate | Stream Head |
|---|---|---|---|---|---|
| 0 | - | - | - | - | False |
| 1 | +1, 1 | +1, 1 | +1, 1 | - | False |
| 3 | +2, 1 | +3, 1 | +2, 1 | - | False |
| 6 | +3, 2 | +6, 1 | +5, 1 | +3, 2 | True | conf 2 because match    matches 6-3 = 3    set P + increase conf

C)

| Address | (Y)oung | (O)ld | (R)andom | (P)refetch candidate | Stream Head |
|---|---|---|---|---|---|
| 0 | - | - | - | - | False |
| 1 | +1, 1 | +1, 1 | +1, 1 | - | False |
| 3 | +2, 1 | +3, 1 | +2, 1 | - | False |
| 6 | +3, 2 | +6, 1 | +5, 1 | +3, 2 | True |
| 7 | +1, 1 | +7, 1 | +6, 1 | - | False |

D)

| Address | (Y)oung | (O)ld | (R)andom | (P)refetch candidate | Stream Head |
|---|---|---|---|---|---|
| 0 | - | - | - | - | False |
| 1 | +1, 1 | +1, 1 | +1, 1 | - | False |
| 3 | +2, 1 | +3, 1 | +2, 1 | - | False |
| 6 | +3, 2 | +6, 1 | +5, 1 | +3, 2 | False |
| 7 | +1, 1 | +7, 1 | +6, 1 | - | False |
| 9 | +2, 1 | +9, 1 | +6, 1 | +3, 3 | True |

⎫ inherit stream head matches 9-6 = 3    set P + increase conf

E)

| Address | (Y)oung | (O)ld | (R)andom | (P)refetch candidate | Stream Head |
|---|---|---|---|---|---|
| 0 | - | - | - | - | False |
| 1 | +1, 1 | +1, 1 | +1, 1 | - | False |
| 3 | +2, 1 | +3, 1 | +2, 1 | - | False |
| 6 | +3, 2 | +6, 1 | +5, 1 | +3, 2 | False |
| 7 | +1, 1 | +7, 1 | +6, 1 | - | False |
| 9 | +2, 1 | +9, 1 | +6, 1 | +3, 3 | False |
| 12 | +3, 4 | +12, 1 | +9, 1 | +3, 4 | True |

⎫ inherit stream head matches 12-9 = 3    set P + increase conf

F)

| Address | (Y)oung | (O)ld | (R)andom | (P)refetch candidate | Stream Head |
|---|---|---|---|---|---|
| 0 | - | - | - | - | False |
| 1 | +1, 1 | +1, 1 | +1, 1 | - | False |
| 3 | +2, 1 | +3, 1 | +2, 1 | - | False |
| 6 | +3, 2 | +6, 1 | +5, 1 | +3, 2 | False |
| 7 | +1, 1 | +7, 1 | +6, 1 | - | False |
| 9 | +2, 1 | +9, 1 | +6, 1 | +3, 3 | False |
| 12 | +3, 4 | +12, 1 | +9, 1 | +3, 4 | True |
| 13 | +1, 1 | +13, 1 | +10, 1 | +6, 2 | True | new stream head

Matches → set P + increase conf 13-7 = 6

FIG. 14

PREFETCHING BASED ON DETECTION OF INTERLEAVED CONSTANT STRIDE SEQUENCES OF ADDRESSES WITHIN A SEQUENCE OF DEMAND TARGET ADDRESSES

BACKGROUND

Technical Field

The present technique relates to the field of data processing. More particularly, it relates to data prefetching.

Technical Background

Pipeline stalls caused by instructions waiting for data to be returned from memory can be one of the main factors in holding back performance in a modern processor. To try to improve performance, it is possible to provide circuitry for predicting what addresses may be required in future and prefetching data associated with the predicted addresses ahead of the time when data accesses for those addresses are actually requested by the processing circuitry.

SUMMARY

At least some examples provide an apparatus comprising:
processing circuitry to issue demand memory access requests to access data stored in a memory system;
stride pattern detection circuitry to detect whether a sequence of demand target addresses specified by the demand memory access requests issued by the processing circuitry includes a plurality of constant stride sequences of addresses interleaved within the sequence of demand target addresses, each constant stride sequence comprising addresses separated by intervals of a constant stride value; and
prefetch control circuitry to control issuing of prefetch load requests to prefetch data from the memory system, the prefetch load requests specifying prefetch target addresses predicted based on the plurality of constant stride sequences detected by the stride pattern detection circuitry.

At least some examples provide an apparatus comprising:
means for issuing demand memory access requests to access data stored in a memory system;
means for detecting whether a sequence of demand target addresses specified by demand memory access requests issued by the means for issuing demand memory access requests includes a plurality of constant stride sequences of addresses interleaved within the sequence of demand target addresses, each constant stride sequence comprising addresses separated by intervals of a constant stride value; and
means for controlling issuing prefetch load requests to prefetch data from the memory system, the prefetch load requests specifying prefetch target addresses predicted based on the plurality of constant stride sequences detected by the means for detecting.

At least some examples provide a method comprising:
issuing demand memory access requests to access data stored in a memory system;
detecting whether a sequence of demand target addresses specified by issued demand memory access requests includes a plurality of constant stride sequences of addresses interleaved within the sequence of demand target addresses, each constant stride sequence comprising addresses separated by intervals of a constant stride value; and
controlling issuing prefetch load requests to prefetch data from the memory system, the prefetch load requests specifying prefetch target addresses predicted based on the plurality of constant stride sequences.

Further aspects, features and advantages of the present technique will be apparent from the following description of examples, which is to be read in conjunction with the accompanying drawings.

BRIEF DESCRIPTION OF THE DRAWINGS

FIG. 14 illustrates a worked example of applying the stride pattern detection technique to an example sequence of addresses.

DESCRIPTION OF EXAMPLES

Figure 1:
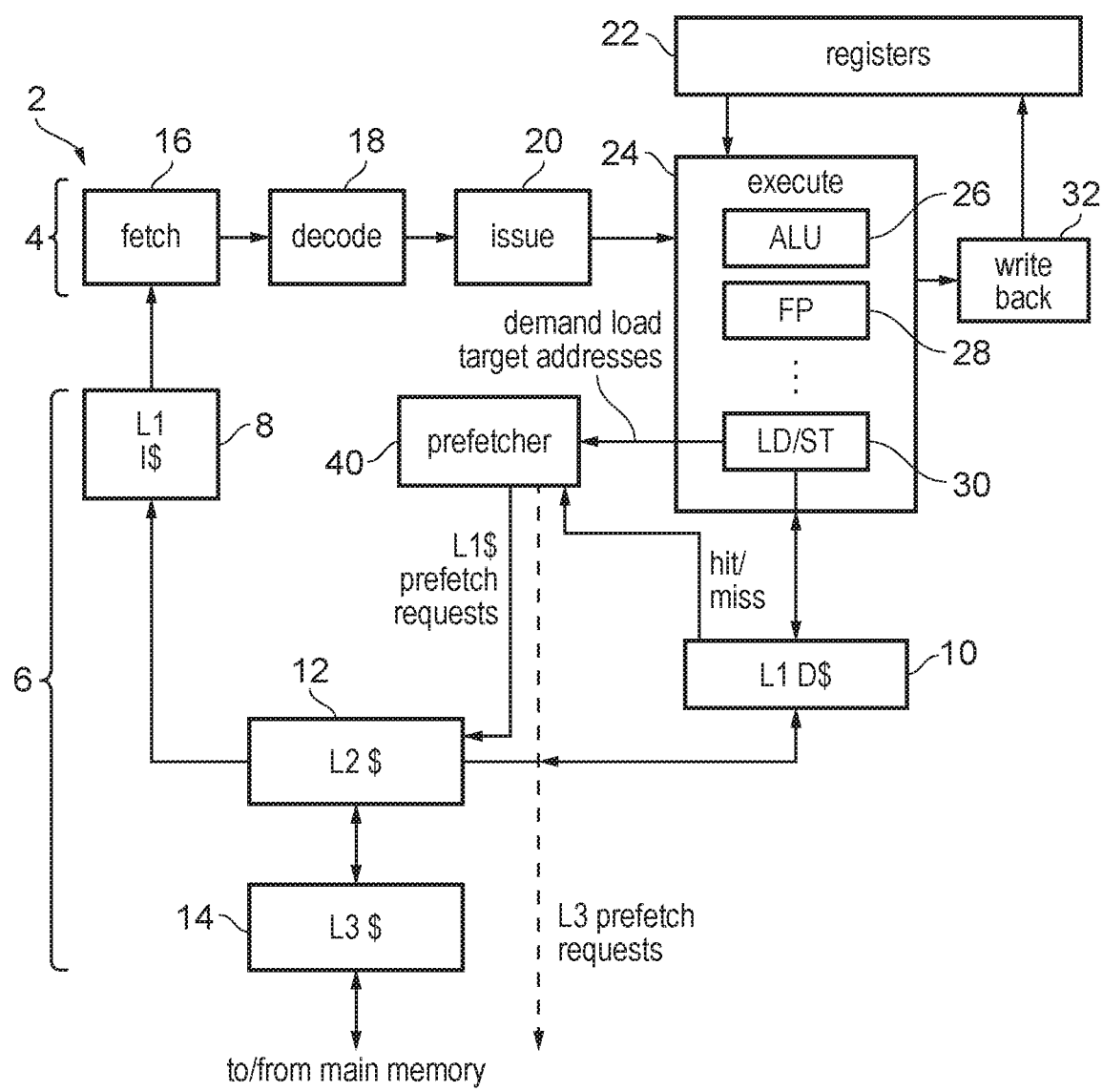
FIG. 1 schematically illustrates an example of a data processing apparatus having a prefetcher.

A data processing apparatus may have processing circuitry for issuing demand memory access requests to access data stored in a memory system. The demand memory access requests may be memory access requests which are issued as a direct consequence of executing a memory access instruction which explicitly indicates that data is to be accessed in the memory system. The demand memory access requests could be load (read) requests, which request that data from a specified target address is loaded from the memory system, or store (write) requests, which request that data is written to a memory location identified by a specified target address.

Stride pattern detection circuitry is provided to detect whether a sequence of demand target addresses specified by the demand memory access requests issued by the processing circuitry includes constant stride sequences of addresses which are interleaved within the sequence of demand target addresses. A constant stride sequence comprises addresses separated by intervals of a constant stride value. Prefetch control circuitry is provided for controlling issuing of prefetch load requests to prefetch data from the memory system, where the prefetch load requests specify prefetch target addresses which are predicted based on the constant stride sequences detected by the stride pattern detection circuitry. While the demand memory access requests are issued in response to executed instructions, the prefetch load requests may be requests issued speculatively based on addresses predicted to be useful for future instructions which have not yet been encountered. When a given constant stride sequence is detected within the sequence of demand target addresses already seen, it can be predicted that subsequent addresses may follow the same stride sequence, with successive addresses in the sequence separated by intervals of a given constant stride value, and so this can be used as the basis for predicting the future addresses to be used as the prefetch target addresses of the prefetch load requests. This allows data anticipated to be needed in future to be prefetched into a cache ahead of time so it is more likely than when a subsequent instruction is actually executed then the data access may hit in the cache, reducing the access latency and hence improving performance.

Note that the stride pattern detection circuitry may be trained based on demand target addresses of either load requests or store requests issued on demand in response to executed instructions. It may not be immediately apparent that store requests (which write data to memory) could benefit from prefetching, as one might think they are not dependent on data awaited from memory. However, in practice, if a store request requests modification of only part of a cache line, then the rest of the cache line not being updated may be required to be obtained from the memory system (if not available already) to allow the cache line to be updated in a cache. Hence, store requests may also be deferred due to cache misses, and so prefetching data from prefetch target addresses ahead of time can also benefit store requests.

One typical approach for implementing the stride pattern detection circuitry is to provide circuit logic which is able to detect a constant stride sequence of addresses where the temporally adjacent addresses in the sequence of demand target addresses are separated at intervals of a constant stride value. For example, a sequence such as 2, 4, 6, 8, 10, 12, etc., where each successive address corresponds to the result of adding a constant stride value of 2 to the immediately preceding address, could be detected as a constant stride sequence.

However, sometimes the sequence of demand target addresses specified by the processing circuitry may involve a more complex pattern of address accesses which does not map to a single constant stride sequence with constant stride value. For example, consider the following address sequence 0, 1, 3, 6, 7, 9, 12, 13, 15, 18, etc., which does not involve a constant offset between two adjacent addresses in the sequence. Nevertheless, there is a consistent pattern, in that the strides between one address and the next follow a cyclic pattern +1, +2, +3, +1, +2, +3, +1, +2, +3, etc. Such a sequence could arise, for example, when a series of records are stored in memory, where each record includes data spanning multiple addresses, and the software processing the records does not need all of the data from each record but instead needs to pick out certain selected parts of each record. In this case there may be a consistent pattern in processing each record, but the offset at which the individual items of data within a particular record need to be extracted may not follow a constant stride pattern. For example, in the example sequence above, the data at address offsets of +1 and +2 relative to the preceding address may pick out certain parts of the record and then the +3 offset may then result in a next access identifying the first item to be extracted in the subsequent record, and then this pattern may be repeated for each subsequent record to be processed. It will be appreciated that this is just one example in which such an address sequence could arise which has non-constant stride, but for which the strides vary in a cyclic pattern.

As such patterns of addresses are difficult to detect using a simple stride detector for detecting a single constant stride sequence, such patterns of accesses may require more complex stride pattern detection circuitry, but nevertheless they are frequent enough that providing stride pattern detection circuitry able to detect such a pattern could improve performance by increasing the likelihood that the required data can be prefetched into a cache ahead of the time when it is needed.

For training stride pattern detection circuitry to detect such sequences with cyclically varying strides, one approach could be to provide a stride history register which records the relative strides of each successive address compared to the preceding address in the sequence of demand target addresses. For example, each time a new demand target address is seen, the stride between the latest demand target address and the preceding demand target address could be shifted in at one end of the stride history register, with all the other strides seen previously shifted up one position, and the oldest stride recorded in the history register shifted out at the other end. Such a stride history register can then be analysed to identify the cyclic pattern of strides seen within the sequence discussed above. Once the cyclic pattern has been identified, a record could be allocated in prefetch control circuitry to identify the particular cyclic pattern (+1, +2, +3 in the example above) encountered within the sequence of demand target addresses as a whole. This record tracking the cyclic pattern could then be used to control prefetching, for example by stepping through predicted prefetch target addresses with the relative offset for the next prefetch address chosen according to the next stride in the cyclic pattern. For example the prefetch control circuitry could be aware that, if the last stride from the cyclic pattern used was the +2 stride then the next time it should add +3 to the most recent prefetch address to determine the next prefetch target address to be specified in a prefetch load request.

However, a problem with this approach to detecting sequences with cyclically varying strides is that it can be harder to control the issuing of prefetch load requests based on patterns where the stride varies at different parts of the pattern. This is because one aim for a prefetcher may be that, not only can the addresses required for future memory access instructions be predicted successfully, but also that the data from those addresses is able to prefetched in sufficient time that the data is already available in the cache at the time when the memory access instruction is executed which later triggers a demand memory access request to that address. On the other hand, while prefetching a very long way ahead of the latest seen demand target address could increase the chances that addresses of future demand memory access requests will be cached, doing too much prefetching can result in other addresses being evicted from the cache, which may have a negative impact on performance overall. Therefore, to balance these competing demands, one way of controlling the prefetching can be to use a concept of prefetch distance, so that the prefetcher tries to issue sufficient prefetch load requests that the latest prefetch target address for which a prefetch load request was issued remains a certain distance ahead of the latest demand target address seen in a stride sequence. This distance can be chosen to be sufficient to cover the estimated memory latency so that it is more likely that the data from the prefetched addresses will be ready in the cache by the time the corresponding memory access instructions are executed, but may not be so large that this triggers unnecessary evictions of other cached data prematurely.

However, when using the prefetch distance to decide how many prefetch load requests to issue, this can be relatively difficult for a prefetcher controlled based on a pattern-wide record specifying the cyclic sequence of strides, such as the +1, +2, +3 example described above. This is because deciding how many requests are needed may require an iterative operation where each successive stride offset is added one at a time to the previous address to find the next address according to the cyclic pattern. This takes more time and requires more complex processing circuitry than in the case of a single constant stride sequence, for which the address of a future prefetch load request can be determined by adding a multiple of the constant stride to the last seen demand target address, which is much simpler in terms of hardware and circuit timings. This means that stride pattern detection can be much more efficient when the stride pattern detects constant stride streams of addresses.

The inventors recognised that when a sequence of demand target addresses includes a more complex pattern of addresses which involves multiple different stride values alternating in a cyclic pattern, rather than attempting to detect the cyclic pattern of strides as a whole, it is possible to decompose that more complex sequence into two or more constant stride sequences of addresses which are interleaved within the sequence of demand target addresses. For example, in the sequence with +1, +2, +3 strides as shown above, the overall address sequence could be decomposed into two streams, one of constant stride +3 (0, 3, 6, 9, 12, 15, 18, etc.) and another constant stride sequence using a stride of +6 (addresses 1, 7, 13, etc.). Alternatively, the same sequence could be decomposed into three different constant stride sequences each using the same constant stride value of +6, but with different starting points for the sequences (e.g. a first sequence 0, 6, 12, 18, a second sequence 1, 7, 13, 19, and a third sequence 3, 9, 15, 21).

Hence, the stride pattern detection discussed below is capable of detecting whether a sequence of demand target addresses includes two or more constant stride sequences of addresses which are interleaved within the sequence of demand target addresses, rather than attempting to detect the overall more complex sequence as a whole. By decomposing the more complex sequence into several simpler sequences each having a constant stride value, this makes control over prefetching much simpler (e.g. based on the prefetch distance). Therefore, this allows the processing circuit logic overhead of the prefetch control circuitry to be reduced compared to stride pattern detection circuitry which attempts to track a cyclic pattern of strides as a global pattern.

In the case when the stride pattern detection circuitry detects that the sequence of demand target addresses does include two or more constant stride sequences interleaved with each other, the prefetch control circuitry may control issuing of the prefetch load requests based on a separate prefetch control algorithm for each of the individual constant stride sequences which were identified as being interleaved within the overall sequence of demand target addresses. This contrasts with the cyclic pattern detector discussed above where a single global algorithm would predict the prefetch addresses for the overall pattern as a whole, by cycling through the different values of stride. By using a separate prefetch control algorithm for each of the interleaved constant stride sequences, this not only makes prefetch distance estimation simpler as discussed above, but also this can enable an existing circuit implementation for issuing prefetch requests according to a single constant stride sequence to be reused for each of the circuits implementing the separate prefetch control algorithms for the decomposed constant stride sequences. Therefore, this can also make system development more straightforward.

When the stride pattern detection circuitry detects that there are interleaved constant stride sequences, issuing of the prefetch load requests may be controlled based on respective prefetch distances determined separately for each of the interleaved constant stride sequences. For example the prefetch distance for a given constant stride sequence may comprise a multiple of the constant stride value detected for that given constant stride sequence. For a given constant stride sequence, the prefetch control circuitry may trigger issuing of a next prefetch load request for the given constant stride sequence, when a distance between a target address of a last demand memory access request associated with the given constant stride sequence and a target address of a last prefetch load request issued for the given constant stride sequence is less than the prefetch distance determined for the given constant stride sequence. By handling the prefetch distance separately for each of the interleaved constant stride sequences, this can provide much simpler control of prefetching than if prefetch distances have to be evaluated for a more complex pattern involving varying strides at different points of the sequence.

The stride pattern detection circuitry may assign a level of confidence in predictions made of whether the sequence of demand target addresses includes a particular constant stride sequence corresponding to a given constant stride value. When the level of confidence for a particular constant stride sequence exceeds a confidence threshold, the stride pattern detection circuitry may control the prefetch control circuitry to start issuing of prefetch load requests for prefetch target addresses predicted based on the given constant stride value for that sequence.

The stride pattern detection circuitry may maintain at least one training table which includes two or more entries. Each entry may identify a given demand target address from the sequence of demand target addresses, and at least one delta value specifying a difference between the given demand target address and an earlier demand target address in the sequence of demand target addresses. Hence, by keeping a record of previously seen addresses and the offsets relative to earlier addresses encountered prior to those previously seen demand target addresses, earlier and later strides can be compared to try to identify consistent patterns in strides which can be used as a basis for predicting a constant stride sequence with addresses separated at intervals of a constant stride value, even if the addresses separated by the constant stride are not immediately adjacent in time within the sequence of demand target addresses.

In response to receipt of a new demand target address in the sequence of demand target addresses seen from the processing circuitry, the stride pattern detection circuitry may perform a stride comparison process for each of a subset of one or more earlier entries in the at least one training table. For a given earlier entry, this stride comparison process includes comparing at least one delta value of the given earlier entry with a determined stride value determined based on a difference between the new demand target address and the given demand target address specified by the given earlier entry. When the determined stride value matches one of the at least one delta value of the given earlier entry, a level of confidence (associated with a prediction that the new demand target address is a member of a constant stride sequence separated at intervals matching the determined stride value) can be increased. Hence, the table can be used to identify when there are consistent patterns where different pairs of addresses seen in the sequence are separated by the same stride value, and the more often this happens for the same stride value, the greater the confidence. Once confidence in a constant stride sequence is sufficiently high, a prefetcher can start prefetching data into a cache based on the predicted future addresses in that constant stride sequence. By recording past addresses and the corresponding past delta values in a table this means that it is possible to detect such stride sequences even if they involve addresses which are not temporally adjacent within the sequence of demand target addresses, so that the stride pattern detection circuitry is able to detect constant stride sequences that are interleaved within the sequence of demand target addresses.

The particular earlier entries which are selected as the subset of entries (for which the stride comparison is performed with respect to the new demand target address) can be selected in different ways. It would be possible to perform the stride comparison process against every earlier entry recorded in the at least one training table, but this may be expensive in terms of circuit area overhead and performance, and in practice the likelihood of the stride value determined between the address of the earlier entry and the new demand target address matching one of the previously recorded delta values for that earlier entry tends to reduce for addresses which are separated a long distance apart within the memory address space. Therefore, to limit the overhead of performing the stride comparisons, one approach is to select, as the subset of one or more earlier entries, earlier entries for which the given demand target address lies in a same address region as the new demand target address, where an address region refers to a certain block of addresses of predetermined size. For example, the memory address space could be logically divided into regions of a certain size such as 4 kB or 1 MB, and the stride pattern detection circuitry may select, for performing the stride comparison process, any earlier entries relating to the same region as the region containing the new demand target address. For example, one way of achieving this is to structure the at least one training table so that a number of separate tables are maintained, each associated with a corresponding address region. In this case, the subset of earlier entries used for the stride comparison process could include any other valid entries in the same training table as the table into which the new demand target address is to be allocated.

This approach of considering only entries relating to the same address region as the new demand target address can be effective, however it may risk not being able to detect cases where a stride pattern of addresses spans two adjacent regions of the address space. Therefore, as well as one or more earlier entries which correspond to an address in the same address region as the new demand target address, the subset of earlier entries used for the stride comparison process could also include entries for which the given demand target address specified by the entry is in a neighbouring address region to the address region comprising the new demand target address. This can help to increase the likelihood that a constant stride sequence can be detected by the stride pattern detection circuitry.

As discussed above, each entry may have fields specifying at least one delta value which specifies a difference between the given demand target address recorded in that entry and an earlier demand target address. When a new demand target address is received and the stride comparison process determines a stride between the new demand target address and addresses in each of a certain subset of earlier entries, then out of all the determined stride values determined for that subset of earlier entries, a subset of these determined stride values can be recorded in the delta value(s) of the new entry allocated for the new demand target address. In some cases each delta value may, in addition to specifying the stride (difference) between addresses, also specify a level of confidence, which may track how many times the same stride has been seen before.

The number of different delta values recorded within each entry can be an implementation choice. At one extreme, if the stride comparison process is performed for a certain number of earlier entries when training the predictor based on a new demand target address, it would be possible to record all of the determined stride values for each of those earlier entries as delta values in the new entry associated with the new demand target address. This approach can improve prediction accuracy because there are more opportunities to detect that a stride found for the latest demand target address matches a stride seen earlier, because in this case every offset between every pair of earlier seen addresses involved in the stride comparison process is recorded (at least for addresses that fall within the same region of the address space, and possibly in neighbouring regions as discussed above). However, this approach may be expensive in terms of circuit overhead as it may require a greater amount of storage circuitry per entry of the table and a greater amount of comparison logic for comparing the determined stride values of each of the delta values of the earlier entries.

At the other extreme, it would be possible for each entry of the training table(s) to specify only one delta value, which could be selected from among the determined stride values involved in the stride comparison process being performed for the subset of earlier entries when a new entry is allocated. This approach may be much simpler in terms of circuit overhead, but only having one previously seen stride available per entry may limit the prediction accuracy because it is possible that even if there is a constant stride sequence present within the demand target address sequence, this may not be detected because the stride seen earlier which was required to be able to detect that sequence may not have been chosen as the stride recorded in the delta value for the relevant earlier entry.

Therefore, a balance between prediction accuracy and hardware cost can be that each entry of the at least one training table may specify two or more delta values which specify stride offsets relative to respective different earlier demand target addresses, but those delta values do not represent all of the possible stride offsets determined as determined stride values in the stride comparison process for each of the earlier entries subject to the stride comparison process when a new entry of the table is allocated. For example, among the determined stride values determined for the new demand target address with respect to the addresses of the subset of earlier entries, a proper subset of these strides could be selected for allocating as the delta values for the new entry for the new demand target address, excluding at least one of the determined stride values.

The inventors have found that the subset of delta values to be allocated to a new entry can be chosen so as to provide the greatest contribution towards prediction accuracy, by selecting those delta values in the way discussed below. For example, there may be certain delta values which may provide a greater contribution than others.

For example, for each entry the at least one delta value may comprise an oldest delta value which specifies a difference between the given demand target address associated with that entry and an oldest earlier demand target address in the sequence of demand target addresses which lies within either the same address region as the given demand target address itself or a neighbouring address region to the address region including that given demand target address. Here, the "oldest" address refers to the address associated with the demand memory access request which was issued earliest in time. It can be useful to record, in each training entry, a delta value corresponding to the difference between the given demand target address relative and the oldest earlier demand target address within the same or neighbouring address region, because in practice it is common for constant stride sequences to be derived relative to the very first address seen in a given address region, and such stride sequences may be more common than cases when there is first an arbitrary access to a new address region not part of a stride sequence followed by a subsequent stride sequence within that address region which is not correlated with the oldest demand target address seen in that address region.

Also, it can be useful for the at least one delta value to comprise a youngest delta value which specifies a difference between the given demand target address of a given training entry in the training table and a youngest (most recently seen) earlier demand target address in the sequence which lies within either the same address region as the given demand target address or a neighbouring address region. This exploits the fact the often there can be more correlation in the strides between addresses accessed recently in time than between addresses separated by a greater time, so recording the youngest delta value can be beneficial.

In another example, the at least one delta value recorded for a given entry of the training table may comprise a random delta value which specifies a difference between the given demand target address and a randomly selected earlier demand target address in the sequence which lies within either the same address region as the given demand target address or a neighbouring address region adjacent to the region including the given demand target address. It may seem extremely counter-intuitive that there would be merit in randomly selecting an earlier demand target address for which the offset to the given demand target address should be recorded in the training table. However, counter-intuitively the inventors have recognised, and observed from empirical analysis of the algorithm proposed below, that recording a delta value corresponding to a randomly selected earlier demand target address in the sequence statistically simulates the ability to record delta values with respect to all earlier demand target addresses in the sequence, when the training algorithm is run over a period of time even though not all the possible delta values are actually stored. This reflects the fact that, even if on one instance of an address in a constant stride sequence, the random selection misses capturing the relevant stride, and so the opportunity to detect the pattern is missed, as the sequence continues there will be further opportunities to detect the pattern, and with each successive instance of another address in a constant stride sequence, the probability that eventually the random selection works and the matching stride is detected increases. Therefore, statistically the random selection enables a sufficiently high likelihood that constant stride sequences of addresses which are non-adjacent within the temporal order of the demand target address sequence can be detected, without needing to incur the full hardware overhead discussed above of recording every possible earlier stride as delta values within the table. Therefore, recording a random delta value can be beneficial to achieving an appropriate balance between prediction accuracy and hardware cost. It will be appreciated that references to "random" and "randomly selected" in the present application may refer to either a true random selection or to a pseudorandom selection (using a true random number generator is possible, but not essential as a pseudorandom number generator can be enough to provide sufficient randomness).

In another example, it can be useful for the at least one delta value to comprise a prefetch candidate delta value which specifies a difference between the given demand target address for a particular training entry and an earlier demand target address specified in a matching entry of the table which is detected as specifying at least one delta value which matches the difference between the given demand target address and the earlier demand target address of the matching entry. As an example, if the earlier demand target address of the matching entry is 9 and the matching entry specifies delta values of 2 and 3 as derived from even earlier entries of the training table, then when a new demand target address of 12 is seen, it can be determined that the difference between the new target address and the earlier address of the matching entry is 3, which matches one of the delta values specified in that entry, and so in this case the stride between the earlier and new addresses of 3 can be recorded as a prefetch candidate delta value (even if that earlier entry would not otherwise be selected as the oldest, youngest or random entry). Recording a prefetch candidate delta value in each entry, if one is available, helps to further improve prediction accuracy because it increases the likelihood that once matching of a delta value against the stride for a new demand target address has been identified, then those matching strides tend to be retained within the prefetch candidate delta value field and this then allows confidence to build as that stride is seen again. That is, the prefetch candidate helps to maintain those delta values which have been found to be useful, where the same stride is being repeated at different parts of the sequence.

Hence, for each entry it is possible to record two or more delta values which could include any two or more of the delta values discussed above or could include other types of delta value. In the algorithm below it has been found that recording the oldest delta value, youngest delta value, random delta value and prefetch candidate delta value provides a good balance between prediction accuracy and hardware cost, but nevertheless it would be possible for other implementations to omit one or more of these delta values or to add extra delta values with respect to earlier entries determined according to some other heuristic.

As well as the indication of the given demand target address and the at least one delta value, each entry of the training table could also include a stream head indication which indicates whether the given demand target address is detected to be the latest demand target address in one of the constant stride sequences detected by the stride pattern detection circuitry. This can be useful for controlling the prefetch control circuitry to then initiate prefetch load requests for any detected constant stride sequences. For example, when a match between the determined stride value and one of the deltas for a given earlier entry is detected, then the stride pattern detection circuitry may assess whether that match is representative of a completely new constant stride sequence not previously encountered, or whether it is a continuation of an earlier seen constant stride sequence, and use this to determine whether to allocate a new stream head indication to indicate that a further constant stride sequence has been detected separate from the already detected constant stride sequence, or whether to transfer the stream head indication from an earlier address within that constant stride sequence to the latest seen address.

As mentioned above, to limit the number of comparisons formed between strides, it can be useful to organise the training tables by address region, so that a number of region tables are each associated with a corresponding address region in the address space, where each address region corresponds to a block of addresses of some predetermined size (the particular size used as the predetermined size may vary from implementation to implementation). The number of region tables provided in hardware may be less than the number of address regions within the overall address space, so a victim selection algorithm may be implemented to select, in cases where all the region tables are already allocated and an address is encountered within a different region not already having a region table allocated, which of the existing region tables should be evicted and reallocated for the new region.

In some examples the region tables may be the only tables provided as the at least one training table of the stride pattern detection circuitry. However, one potential issue is that it may be possible that once a region of the address space has been established as including a useful pattern of constant stride separated addresses, there may then be a single isolated access to an address in a different region, but then there may not be any further addresses from the new region encountered. It may be undesirable to victimise a training table which has been found to provide some useful detection of stride sequences, merely on the off chance that the newly seen address could potentially be the start of another address sequence with constant stride offsets. It may be preferred that an existing region table is not victimised until a certain minimum number of addresses from a new address region have been encountered.

Hence, in some cases the training table may, in addition to the region tables allocated to particular regions of the address space, also comprise a potential entries table which has entries of a similar format to the region table, specifying a given address and at least one delta value for each entry. When encountering a new demand target address from a new address region for which no region table has yet been allocated, then when less than a threshold number of valid entries in the potential entries table specify an address from the new address region, the stride pattern detection circuitry may allocate an entry in the potential entries table for the new demand target address, rather than allocating the new demand target address into a region table. This will tend to preserve the contents of existing region tables for a little longer until at least one further address from the new address region encountered.

On the other hand, when the new demand target address is encountered and a number of valid entries in the potential entries table specifying an address from the new address region is greater than or equal to the threshold number, then a new region table can be allocated to be used for addresses in the new address region (with existing contents of that region table being discarded). In this case, the potential entries table will contain at least one valid entry of the potential entries table which corresponds to another address (other than the new demand target address) from the new address region, and this at least one valid entry can be transferred to the new region table which is allocated to the new address region. An entry can also be allocated in the new region table for the new demand target address.

In one implementation, the threshold number for the potential entries table can be 1. In this case, when encountering a new demand target address from a new address region not already having a region table allocated, the new demand target address will be allocated to the potential entries table if none of the valid entries of the potential entries table specify an address from the new address region; and when the potential entries table already includes an existing valid entry for another address from the new address region, that existing valid entry would be transferred to a newly allocated region table and a new entry would be allocated in the newly allocated region table for the new demand target address.

However, in other implementations, the threshold number could be 2 or more, and in this case the allocation of a new region table may take place on the third (or subsequent) access to an address in the new address region.

Regardless of the particular threshold value chosen, this approach using the potential region table may make better use of the region tables, increasing performance because it is less likely that useful information in an already allocated region table is discarded solely because there was a single access to a memory region which is then never accessed again.

Nevertheless, other implementations could choose not to provide a potential region table at all, and simply victimise a region table on the first demand memory access to a new region.

With the region-based organisation of the training tables, to compress the size of each region table, rather than storing the full given demand target address in each entry, it is possible for each region table to be associated with a base address storage element which stores a base address of the corresponding address region, and for each entry in a given region table to specify the given demand target address as an offset relative to the base address stored in the base address storage element associated with that given region table. This can reduce the number of bits needed per entry.

In contrast to the region tables, as the potential entries table (if provided) may include addresses from different regions, then for the potential entries table the address field may be larger and may specify the full address rather than just the offset relative to a base address. Otherwise, the entries of the potential entries table may operate in a similar way to the entries of the region table as discussed above.

Not all demand target addresses seen in the sequence of demand target addresses need to be used for the training of the training tables in the stride pattern detection circuitry. It is possible for the stride pattern detection circuitry to filter which particular demand target addresses in the sequence are used for training the detection of the constant stride sequences. For example, the stride pattern detection circuitry may exclude from the training a demand target address which hits in a predetermined level of cache and which does not fit within an already detected constant stride sequence. If a demand memory access request hits in a given level of cache, then there may be little benefit in training the prefetcher based on that address, as that memory access was already able to be satisfied relatively quickly even if no prefetching had been formed. By omitting a cache-hitting demand target address from being input to the training process for the prefetcher, this can preserve resources (such as the training table entries) for other entries for which there is more benefit to prefetching, which can improve overall performance. However, if there is a cache hit, but the address does fit within an already detected constant stride sequence, it may still be desirable to subject that address to training, so that the constant stride sequence can be maintained and continue to provide predictions from later sequences, as otherwise an instance of an address in the constant stride sequence being omitted from training could lead to mismatching strides. Hence, for any cache hit that does not fit into a detected constant stride sequence, this can be dropped instead of added to the table, as it indicates that the address is likely to be part of something that does not need prefetching or cannot be easily predicted, so will just clutter up the tables and prevent other addresses being predicted as effectively.

It will be appreciated that this is just one example of filtering and other filter criteria could also be applied. For example, unless part of a constant stride sequence already detected, target addresses of store instructions which update a full cache line (and so are not dependent on awaiting other parts of the cache line to be returned from the memory system) could be omitted from training of the stride pattern detection circuitry, as again these would not benefit from prefetching.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 60 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analyzing patterns of demand target addresses specified by demand memory access requests issued by the load/store unit 30, and detecting stride sequences of addresses where there are a number of addresses separated at regular intervals of a constant stride value. The prefetcher 40 uses the detected stride address sequences to generate prefetch load requests which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example can also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefect request is already in the level 3 cache. However it will be appreciated that the particular caches loaded based on the prefetch requests may vary depending on the particular circuit of implementation.

As shown in FIG. 1, as well as the demand target addresses issued by the load/store unit 30, the training of the prefetcher 40 may also be based on an indication of whether the corresponding demand memory access requests hit or miss in the level 1 data cache 10. The hits/miss indication can be used for filtering the demand target addresses from training as discussed in more detail below.

Figure 2:
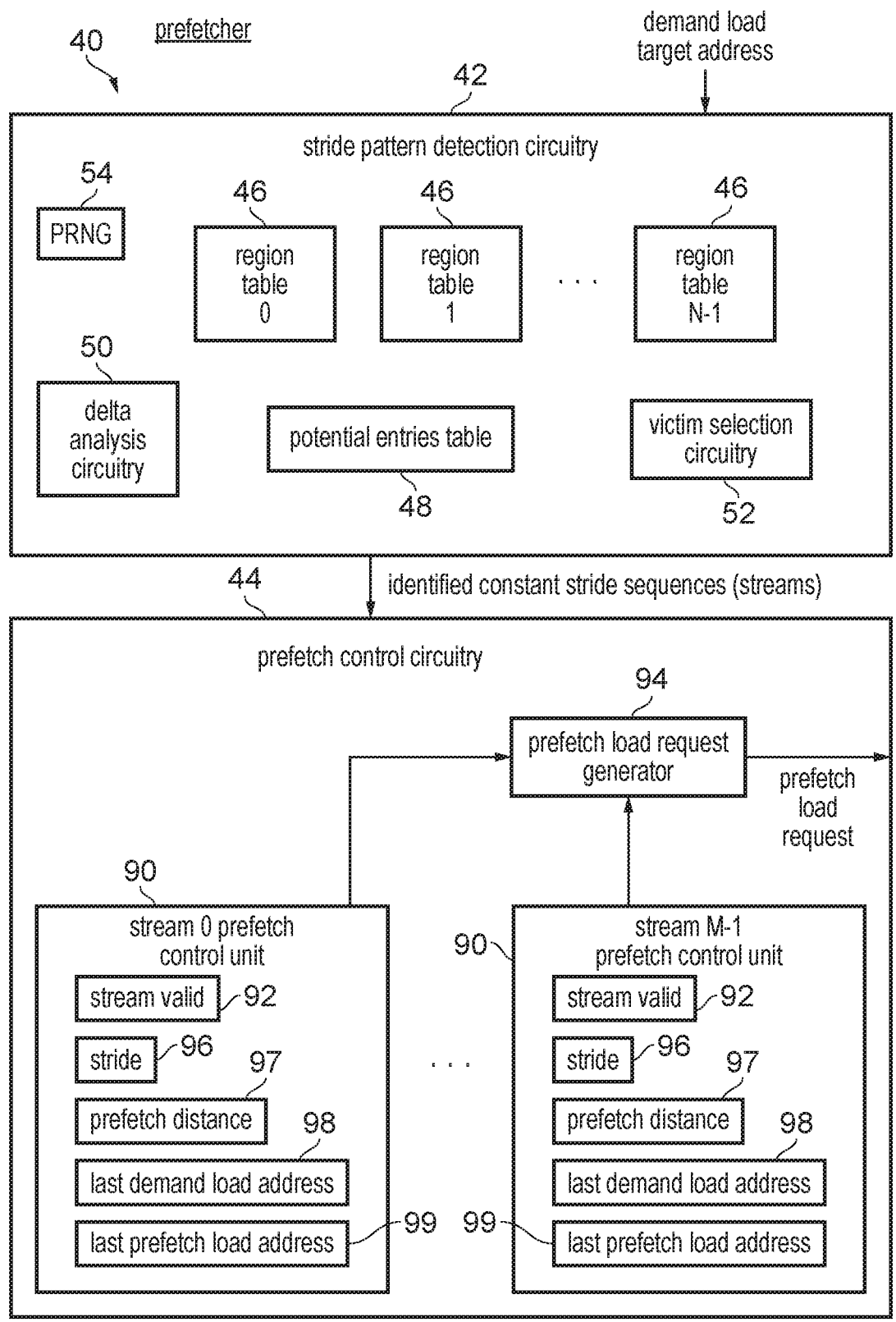
FIG. 2 shows the prefetcher comprising stride pattern detection circuitry and prefetch control circuitry.

FIG. 2 shows an example of the prefetcher 40 in more detail. The prefetcher includes stride pattern detection circuitry 42 for performing a training process based on a sequence of demand target addresses specified by demand memory access requests issued by the load/store unit 30, to identify whether the sequence of demand target addresses includes any constant stride sequences of addresses which may be interleaved within that address sequence. Where address translation is supported, the training could be based either on virtual addresses or on physical addresses, depending on whether the prefetcher predicts virtual or physical addresses. If any constant stride sequences are identified, then the stride pattern detection circuitry 42 provides an indication of these sequences (also known as streams) to prefetch control circuitry 44, which controls the issuing of prefetch load requests to caches or other memory components within the memory system 6, with the prefetch load requests specifying addresses predicted based on the constant stride sequences detected by the stride pattern detection circuitry 42. Unlike other types of stride pattern detection circuitry, the stride pattern detection circuitry 42 has circuitry able to detect cases when the constant stride sequences are interleaved with each other, so that the addresses within an individual constant stride sequence are not necessarily encountered adjacent to each other in the temporal order of the sequence of demand target addresses. This greatly improves the ability to perform prefetching even in cases where there is a more complex pattern of accesses where there is a regular repetition of two or more different stride values.

As shown in FIG. 2, the stride pattern detection circuitry includes a number of training tables provided in hardware, including N region tables 46 which store entries identifying properties of demand target addresses from corresponding regions of the address space (N is 2 or more). Also the training tables include a potential entries table 48 which records information on demand target addresses which are from a new region of the address space which has not yet encountered a certain minimum number of accesses from the same region, which may potentially be candidates for allocating to a region table 46 if there are a sufficient number of further accesses to the same address region.

The stride pattern detection circuitry has delta analysis circuitry 50 for processing a newly seen demand target address received in the sequence, determining stride offsets with respect to previously seen addresses recorded in the region tables 46 or the potential entries table 48, and comparing those offsets with delta values recorded in the table showing the offsets encountered between those earlier addresses of the compared entries and even earlier target addresses to check whether the stride seen previously has been repeated. Based on this comparison process, the delta analysis circuitry 50 detects whether it is likely that the address sequence includes a constant stride sequence of addresses spaced at regular intervals. The operation of the delta analysis circuitry 50 is described in more detail below.

The stride pattern detection circuitry 42 may also include victim selection circuitry 52 for selecting which entry of the training tables 46, 48 to allocate for a newly seen demand target address when necessary. The victim selection circuitry may determine whether an existing region table 46 should be discarded to make way for entries for new target addresses from a different region, and can also select which particular entry within a table should be used for a given address. The victim selection process is discussed in more detail below.

Also, the stride pattern detection circuitry 42 may include a pseudo random number generator (PRNG) 54 for generating a pseudo random number. This can be useful for making a random selection of which earlier entry has its stride recorded in the newly allocated entry for a newly seen demand target address, as discussed in more detail below.

Figure 3:
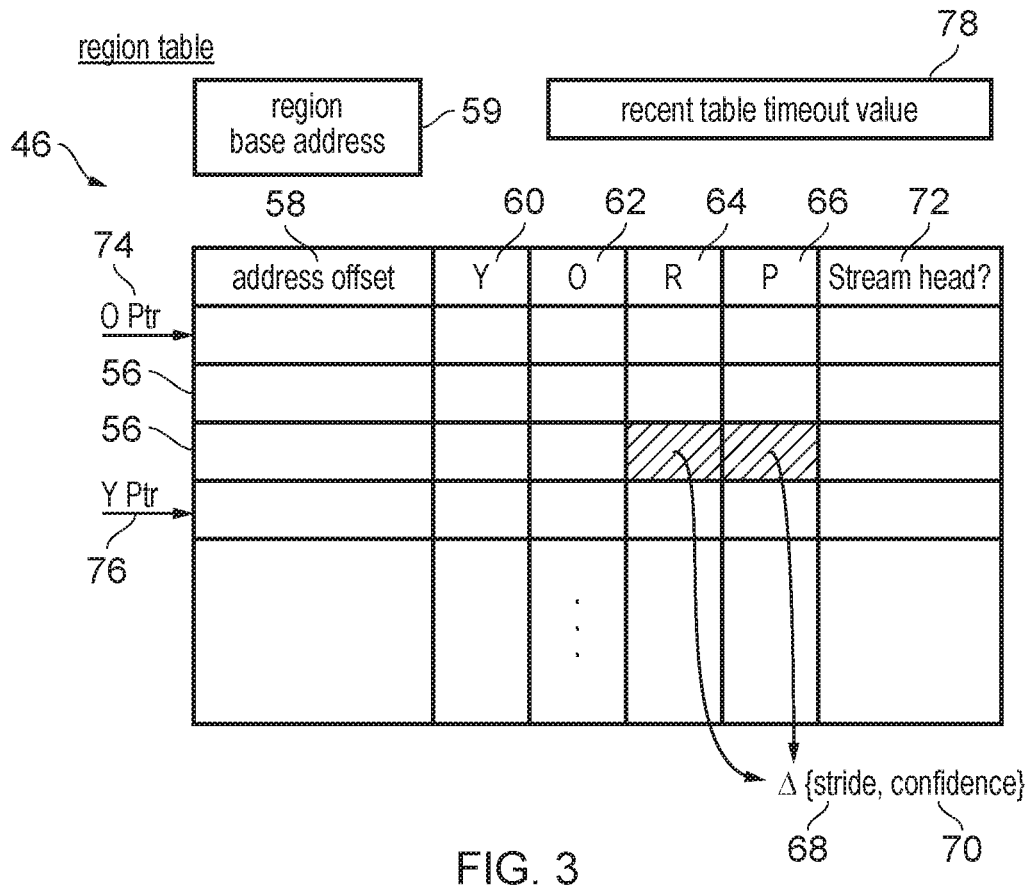
FIG. 3 shows an example of a region table maintained by the stride pattern detection circuitry.

FIG. 3 shows in more detail one of the region tables 46 of the stride pattern detection circuitry 42. The region table includes a number of entries 56 which each, when valid, correspond to an earlier seen demand target address in the sequence of demand target addresses received from the execute stage 24. Although not shown in FIG. 3 for conciseness, each entry 56 may include a valid field which indicates whether the entry is valid, which can be useful for victim selection.

Each entry 56 may identify a corresponding address seen earlier in the sequence of demand target addresses (the address for a given entry is referred to as the "given demand target address"). For the region tables 46, rather than recording the entire address in each entry 56, the entry 56 specifies an address offset 58 which is defined relative to a region base address 59 specifying a base address for an address region in which all of the addresses recorded within the same region table 46 are located. For example, each region table may correspond to a block of addresses of a certain predetermined size (aligned to size boundaries corresponding to that size within the address space). For example the predetermined size could be 4 kB, 1 MB or any other size. By recording the addresses as offsets rather than as absolute addresses this reduces the size of the table. Each region table is also associated with a recent table timeout value 78 which is used for victim selection as described further below. The recent table timeout value can be used to distinguish which region table has least recently been allocated new training entries.

Each entry 56 of the region table also records, in association with the given address 58, a number of delta values 60, 62, 64, 66. Each delta value 60-66 comprises a stride value 68 and a confidence value 70. When an entry 56 has a delta value 60, 62, 64, 66 specifying a stride value 68 equal to some number S, this indicates that when this particular entry 56 was allocated to the table, a stride (address offset) of S was observed between the address of this entry and the address of a previous entry. The confidence value 70 is an indication of how many times that particular stride value of S has been repeated before. For example if a given entry E (56) has a stride value of S which was computed relative to another entry E', and that other entry E' itself had a delta value 60, 62, 64 or 66 with a stride value of S and a confidence value of C, then entry E will be set with the corresponding delta having the stride 68 equal to S and the confidence 70 equal to C+1. Hence, the more times a given stride value is seen between different addresses within the overall sequence of demand target addresses, the greater the confidence becomes. When the confidence 70 for a given stride reaches a certain threshold, then the prefetch control circuitry 44 can start prefetching using that stride value.

As shown in FIG. 3, each entry 56 records a number of deltas, where the strides in each of those deltas are determined with respect of a different earlier entry of the table. Although in principle one could record deltas for every earlier entry when allocating a new entry to the table, this would require a large amount of storage and comparison logic. To reduce the hardware cost, only a subset of the earlier entries have their deltas recorded in the new entry and that subset is selected to include those deltas which are most likely to be useful for predicting stride patterns of addresses. Many heuristics could be used to determine which of the most useful deltas, but in this example the deltas recorded include the youngest delta (Y) 60, the oldest delta (O) 62 and the random delta (R) 64. This means that when we store deltas 60, 62, 64 for a newly allocated entry 56 in the region table, the recorded deltas are those for which the strides were determined against the oldest entry in the region table, the youngest entry in the region table, and a randomly selected table in the region table (where the random selection is based on the pseudo random number produced by the pseudo random number generator 54). It can be useful to record the youngest and oldest deltas because there is a greater probability that the strides will match for the youngest and oldest entries than for the other entries (often the very first access in a new address region may represent the start of a sequence, and tracking the youngest stride enables simple (non-interleaved) constant stride sequences to be detected).

By recording a random entry this can provide a statistical approach where the effect of recording all possible deltas with respect to an earlier entry is simulated, but using less hardware. To be able to detect a stride pattern, it is not essential that every instance of the stride sequence is spotted, just that at some point the sequence is spotted. Randomly varying which earlier stride is captured in the table increases the probability that, as new entries are added to the table, eventually an entry is provided where the random selection may select an earlier entry which matches the same stride value as a later stride, and therefore the stride pattern can be detected. By using a random approach rather than recording all possible deltas, this reduces hardware cost.

In some approaches, the Y, O and R deltas 60, 62, 64 could be determined only with respect to entries in the same region table. However, greater prediction accuracy can be achieved if, as well as considering entries in the same region table stride comparisons also consider entries in a neighbouring region table (if any) which corresponds to a region of the address space which neighbours the region containing the new demand target address being allocated to the region table. Hence, in some cases the Y, O or R entries may also be selected from among the neighbouring table's entries.

In addition to the Y, O and R delta values 60, 62, 64, a fourth delta value 66 called a prefetch candidate (P) delta is recorded in an entry 56. The prefetch candidate delta 66 represents a delta calculated against an earlier entry for which one of the deltas 60 to 66 recorded in that earlier entry matched the stride calculated between the address of that entry and the latest demand target address in the sequence. That is, when allocating a new entry for a demand target address, the stride between the incoming training example and the entries in the region table and any neighbouring region table is calculated for each entry of those tables, and if for any existing entry the stride calculated between the incoming training example and the address in that existing entry matches the stride value of one of the existing entry's delta values, then this stride value is identified as a prefetch candidate. If this comparison process identifies that there are multiple prefetch candidates, the prefetch candidate with the highest confidence can be selected. If there are multiple prefetch candidates each with equal highest confidence then the prefetch candidate with the smallest stride can be selected from among those prefetch candidates having the equal highest confidence. Whichever prefetch candidate ends up being selected as a result of this prioritisation by confidence and then by stride, the selected prefetch candidate is then recorded in the prefetch candidate delta 66 of the new entry 56 in the region table. By recording this prefetch candidate this helps to maintain useful deltas which represent strides that have been seen to repeat.

Hence, in summary the combination of the Y, O, R and P deltas can give a good balance between the hardware storage and comparison logic costs and the prediction capability, giving a reasonable prospect of being able to identify interleaved constant stride sequences without needing to store every possible delta in each entry. Nevertheless, it will be appreciated that other examples could record additional delta values with respect to other entries in the table, or could omit one of these deltas shown in FIG. 3.

In addition to the address offset 58 and the delta values 60 to 66, each entry 56 also includes a stream head indication 72 which can provide a "true" or "false" indication of whether the entry is the latest example in a constant stride sequence of addresses. When an entry 56 is allocated for which a prefetch candidate delta 66 has been identified, then it may inherit the stream head status from the entry its prefetch candidate came from, or if that previous entry had no prefetch candidate, then a new stream has been detected and so the stream head indication can be set for that new entry. In this way the stream head indication may be set to "true" for the last address seen in each individual constant stride sequence (stream) of addresses, where the respective streams may differ in terms of their strides and/or in terms of their starting addresses. Once an entry marked as the stream head has a delta in one of the delta fields with sufficiently high confidence, the address of the stream head entry and the associated stride value are passed to the prefetch control circuitry 44 to start triggering issuing of a prefetch load requests based on further addresses predicted for that stride sequence at regular intervals of the constant stride value.

To help track which entry within a given region table is the oldest (least recently allocated) and youngest (most recently allocated), one or more pointers may be maintained for the region table, pointing to a particular entry identifying the oldest or youngest. For example in FIG. 3 separate oldest and youngest pointers 74, 76 are maintained to point to the oldest and youngest entries respectively. These can be updated as more entries are allocated or discarded and used to identify which entry should be used to derive the Y and O delta values 60, 62 when a new entry is allocated. The use of pointers 74, 76 is just one example of how oldest/youngest entries could be tracked. Another approach could record information within an entry, which identifies whether the entry is the oldest or youngest.

Figure 4:
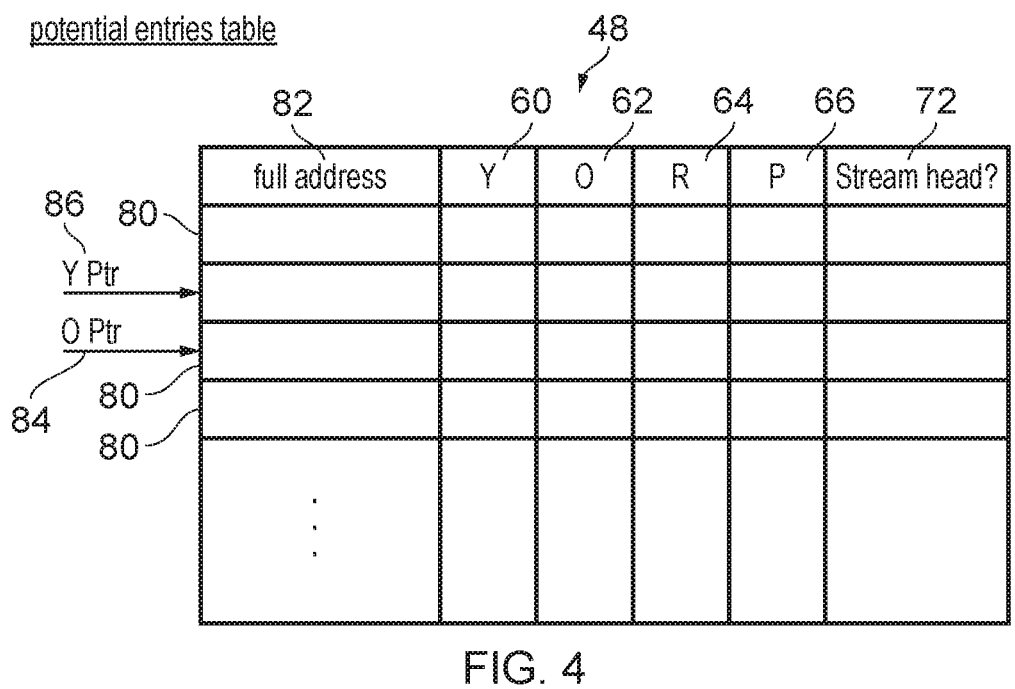
FIG. 4 shows an example of a potential entries table maintained by the stride pattern detection circuitry.

FIG. 4 shows an example of the potential entries table 48 in more detail. The potential entries table includes entries 80 with a similar format to the entries 56 in the region table 46, but instead of storing an address offset 58 to identify the address associated with a given entry, the potential entries table has entries 80 specifying a full address 82. This is because the entries in the potential entries table 48 include addresses from many different address regions, and so it is not possible to assume that they all relate to the same region having a shared region base address. Otherwise, the delta fields 60 to 66 and stream head field 72 behave in the same way as for the region table 46. Again, oldest and youngest pointers 84, 86 can be maintained to track the oldest and youngest entries allocated into potential entries table 48, for the purpose of victim selection and generation of the delta values.

Returning to FIG. 2, the prefetch control circuitry 44 includes a number of stream prefetch control units 90 which can be allocated for control and issuing of prefetch load requests for a given one of the constant stride sequence of addresses identified by the stride pattern detection circuitry 42. When the stride pattern detection circuitry 42 detects a stream having a sufficient level of confidence in the detected stride, then it provides an indication of the stride value for that stream and the address marked using the stream head for that stream to the prefetch circuitry 44, which allocates one of the prefetch control units 90 for recording information on that stream. For example the allocated prefetch control unit may include a stream valid indication 92 which records whether that prefetch record unit is currently processing a valid stream. When the stream valid indication indicates that there is no valid stream being processed, then the stream prefetch control unit does not trigger a prefetch load request generator 94 to generate any prefetch load requests. When a valid stream is allocated to one of the stream prefetch control units 90 then the stride value and stream head address are recorded in a stride register 96 and a last demand load address register 98 for that stream prefetch control unit 90. The stream prefetch control unit determines, based on the stride value 96, a prefetch distance 97 which may be determined as a certain multiple of the stride value 96, and represents a distance ahead of the last seen demand target address 98 associated with a stream, up to which prefetch load requests should be generated for that particular stream. Adding the prefetch distance 97 to the last demand target address 98 prefetch identifies the final address for which prefetch requests should be issued. Hence, if a last prefetch load address 99 for which the latest prefetch load request associated with that stream has already been issued lags behind the sum of the last demand target address 98 and the prefetch distance 97, then a signal may be sent to the prefetch load request generator 94 to issue at least one additional prefetch load request to subsequent addresses obtained by adding the stride value 96 to the last prefetch load address, until the prefetching has again reached sufficiently far in advance of the last demand target address 98 seen for the stream. As demand memory access requests may still be continuing then the stride pattern detection circuitry 42 may constantly update the last demand target address 98 indicated to the prefetch control circuitry 44 for a given stream, with the address being updated when the stream head indication 72 is transferred between entries of the region tables.

Hence, in summary, each stream prefetch control unit 90 effectively operates a state machine which controls prefetching according to a separate algorithm associated with each of the interleaved constant stride sequences identified by the stride pattern detection circuitry 42. Each prefetch state machine implemented by a given prefetch control unit 90 observes the address of the stream head's entry and records the last prefetch address 99 requested already. If the distance 97, as measured by a certain multiple of the prefetch stride 96, between the last prefetch address 99 and the stream head address 98 is not large enough, then it continues issuing prefetches until there is a sufficient distance ahead of the last seen demand target address 98. As discussed above, the prefetch control circuitry 44 may issue prefetch requests to just one cache (e.g. the level 1 cache 10) or could issue to multiple caches, the level 1 and level 3 caches 10, 14 as discussed above. A larger prefetch distance 97 (a larger multiple of the stride 96) may be used as a prefetch distance for a level 3 prefetch in compared to level 1 prefetch to increase the likelihood that level 1 prefetch requests will at least hit in the level 3 cache.

Hence, by providing independent prefetch control units 90 which can be allocated to different constant stride sequences interleaved within the overall pattern of addresses seen from a load/store unit, this makes control of prefetching easier because each prefetch control unit can behave similarly to a prefetcher which can only handle simple constant stride sequences, and the look ahead distance can be controlled as a simple multiple of the stride rather than needing a complex analysis of a varying cycle of strides.

Figure 5:
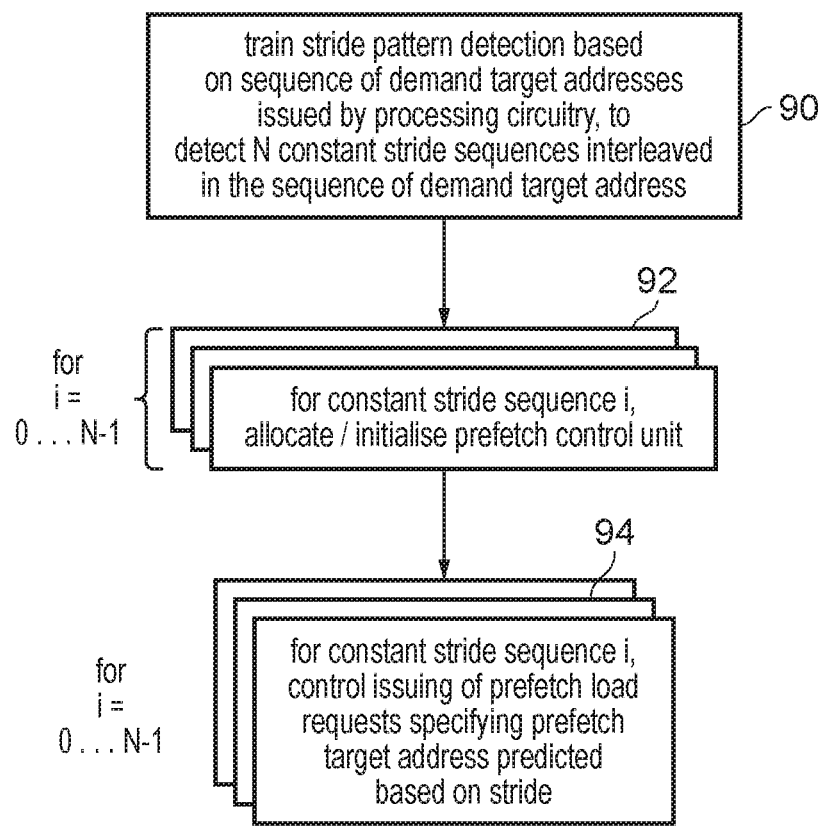
FIG. 5 is a flow diagram illustrating a method of controlling issuing of prefetch load requests based on detection of multiple interleaved constant stride sequences of addresses within a sequence of demand target addresses.

FIG. 5 is a flow diagram illustrating a method of operating the prefetch 40. FIG. 5 shows an overview of the method while FIGS. 6 to 13 show parts of the method in more detail. In these flow diagrams, it will be appreciated that while for ease of explanation some steps are shown as sequentially performed steps, in practice it may be possible to perform at least some of these different steps in parallel.

As shown at step 90 of FIG. 5, the stride pattern detection circuitry 42 receives, over time, a sequence of demand target addresses issued for demand memory access (load/store) requests from the load/store unit 30 of the processing circuitry 4. The stride pattern detection circuitry 42 trains its training tables 46, 48 based on the received sequence of demand target addresses so that it detects a certain number N of constant stride sequences which are interleaved within the sequence of demand target addresses. When constant stride sequences are identified then at step 92, for any particular one of those constant stride sequences i, where i is any number between 0 and N−1, the stride pattern detection circuitry 42 controls the prefetch control circuitry 44 to allocate and initialise one of the stream prefetch control units 90 with the information for the corresponding constant stride sequence i, to initiate the prefetching state machine for controlling the issuing of prefetch load requests for that constant stride sequence. At step 94, for constant stride sequence i, issuing of prefetch load requests to the memory system is controlled by the prefetch load request generator 94, the prefetch load requests specifying prefetch target addresses which are predicted based on the stride value associated with constant stride sequence i. Again, step 94 is performed a number of times for the respective constant stride sequences 0 to N−1 identified by the stride pattern detection circuitry 42. It will be appreciated that steps 92 and 94 for respective constant stride sequences can be performed in parallel with each other. Also, training of the stride pattern detection circuitry 42 at step 90 may continue while constant stride sequences are being used for prefetching at steps 92 and 94.

Figure 6:
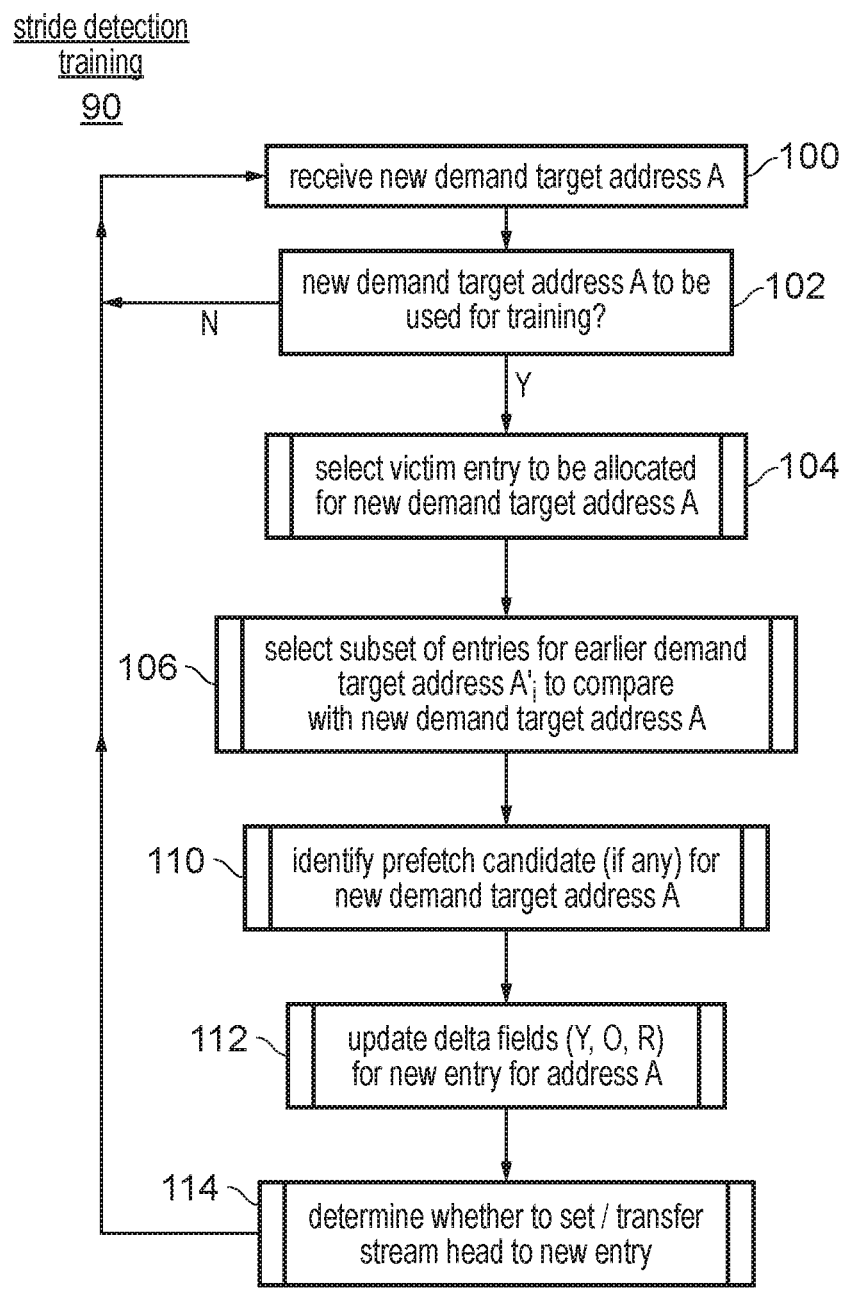
FIG. 6 is a flow diagram illustrating training of the stride pattern detection circuitry.

FIG. 6 is a flow diagram showing in more detail the stride detection training step 90 of FIG. 5. As explained above the training may be an ongoing process with each latest demand target address seen in the sequence being used as a new training example by the stride pattern detection circuitry.

At step 100 the stride pattern detection circuitry 42 receives a new demand target address A in the sequence which could potentially be used as a training example. At step 102 the stride pattern detection circuitry 42 determines whether this new demand target address A should be used for training. In some implementations there may be no filtering of the demand target addresses at all, and in that case the decision at step 102 could always be "yes" with every new demand target address used as a training example. However other implementations may provide some filtering of training examples. For example, if the demand memory access request for address A misses in the level 1 data cache 10, or the address A fits within an already detected constant stride sequence of addresses, then the address A may be used as a training example, but in cases where the address A hits in the level 1 data cache 10 but does not form part of an existing stream, the address A may be excluded from training. Also, if address A is a demand target address of a store request which updates an entire cache line of data, and address A does not fit into an already detected stream of addresses, the address A could be excluded from training. If the address is excluded from training, the method returns to step 100 to wait for the next demand target address in the sequence. This filtering exploits the fact that hits in the level 1 data cache 10 which are not part of a stream represent data which can already be accessed fast by instructions of the pipeline and so there is little benefit to issuing prefetch requests to those addresses. For example, that data could be data which is not accessed in a stride pattern of sequence of addresses but in fact represents an address of a constant which is accessed relatively frequently and so the cache tends to stay warm in respect of that address. By avoiding training based on such an address which hits in the cache but does not represent a prefetchable constant stride sequence, this preserves entries of the training tables, keeping those entries available for other addresses which may have a greater benefit to being prefetched.

If the new demand target address A is to be used as a training example, then the method proceeds to step 104 where the victim selection circuitry 52 selects a victim entry in one of the region tables 46 or the potential entries table 48 which is to be allocated for the new demand target address A. The victim selection step 104 is shown in more detail in FIG. 7 discussed further below.

Having selected a victim entry, at step 106 the stride pattern detection circuitry 42 selects a subset of entries for earlier demand target addresses, A'$_i$, which can be compared with the new demand target addresses. The selection of this subset is shown in more detail in FIG. 8 discussed below.

Having selected a subset of earlier entries, at step 110 a stride comparison process is performed for each of those earlier entries to determine a stride between address A and the earlier address A'$_i$ for that earlier entry, and compare the determined stride with the deltas recorded in the earlier entry, to identify whether there is any prefetch candidate possible for the new demand target address A. Here, a prefetch candidate refers to a stride calculated with respect to an earlier entry which matches a delta already seen in that entry. If there is an identified prefetch candidate, the prefetch candidate is recorded in the P delta field 66 for the new entry. The prefetch candidate identification processing is shown in more detail in FIG. 9 discussed further below.

At step 112, based on the prefetch candidate identifications and the strides determined at step 110, the Y, O and R delta fields 60, 62, 64 are updated for the new entry allocated for the new demand target address A. Step 112 is shown in more detail in FIG. 10 which is discussed further below.

At step 114 the stride pattern detection circuitry 42 determines whether the new entry allocated for address A should be identified as a stream head, either by setting the stream head indication 72 to true without transferring stream head status from an earlier entry, in the case where a new constant stride sequence has been identified, or by transferring the stream head status from an existing entry in the case where the address A is found to be a continuation of an already detected stream. Step 114 is shown in more detail in FIG. 11 discussed below. Following step 114 the method then returns back to step 100 to process the next demand target address, and thus training continues based on each successive received address seen from demand memory accesses issued by the processing pipeline 4.

Figure 7:
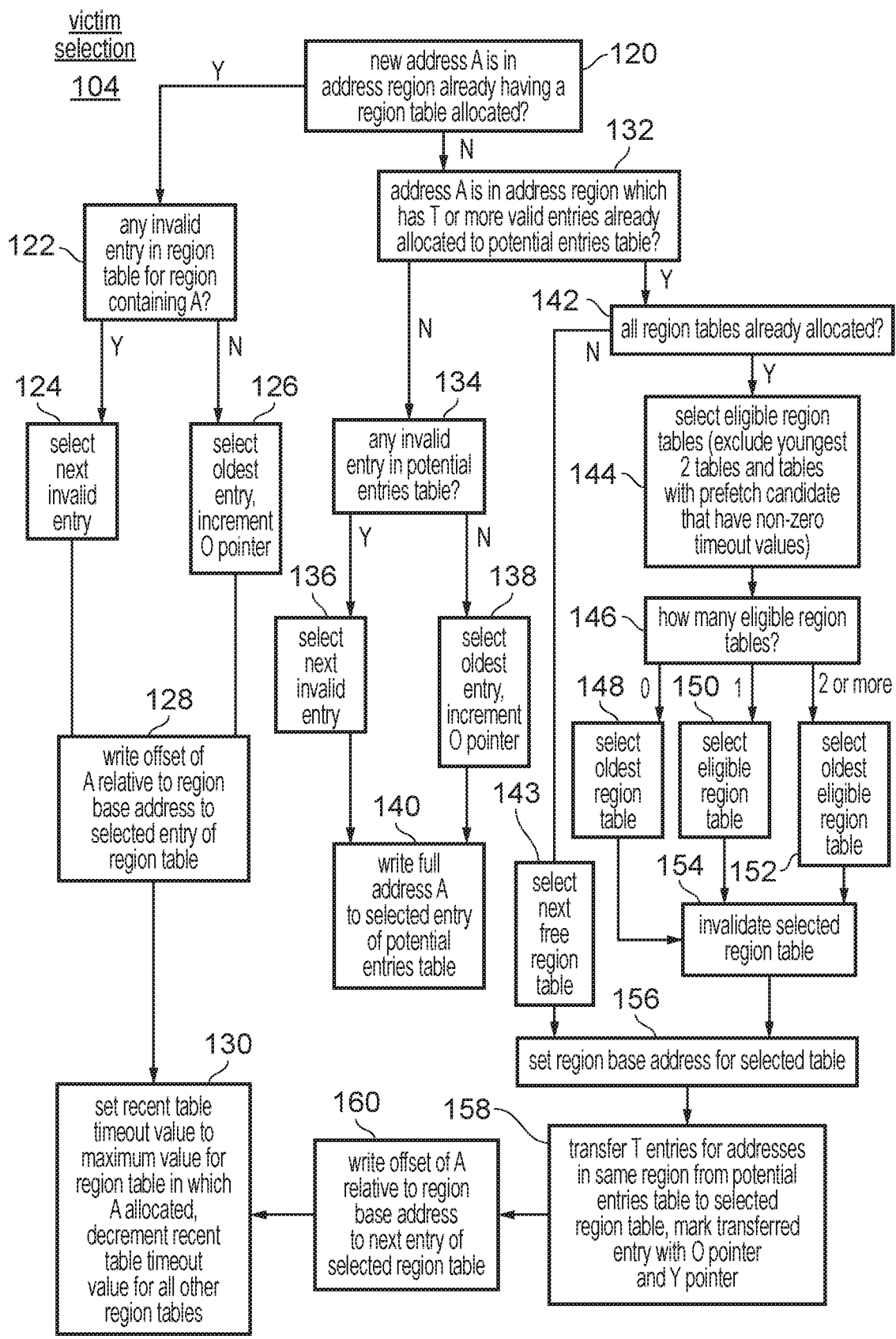
FIG. 7 is a flow diagram showing in more detail a victim selection step of FIG. 6.

FIG. 7 is a flow diagram illustrating the victim selection step 104 of FIG. 6 in more detail. The victim selection process selects whether the entry should be allocated to the potential entries table 48 or one of the region tables 46, and if a region table is selected, which particular region table should be selected. Also, the victim selection process selects which particular entry within the selected table 46, 48 should be allocated for the new address A. It will be appreciated that this is just one example of a possible victim selection process, and other implementations could use a different approach.

At step 120 the victim selection circuitry 52 determines whether the new demand target address A is in an address region which already has a region table 46 allocated for it. This can be determined by comparing the region base addresses 59 with a base address portion of the new address A. If the new address is in a region already having a region table allocated, then the region table 46 already allocated for that address region is selected as the region table to be used for the new address A, and at step 122 the victim selection circuitry detects whether there is any invalid entry in the region table corresponding to the region containing address A. If there is such an invalid entry then at step 124 the next invalid entry of the region table is selected for allocating for the new address A. At step 128 an offset of address A relative to the region base address 59 for the selected region table 46 is written to the address offset field 58 of the selected entry 56 of the region table. At step 130 the recent table timeout value 78 for the selected region table is set to its maximum value, and any recent table timeout values 78 associated with other non-selected region tables 46 are decremented. The fact that an entry has just been allocated to the selected region table indicates that there is a probability that this table contains useful information that should be retained, so setting that table's timeout value 78 to a maximum and decrementing the timeout values 78 for the other tables makes it more likely that other region tables would be victimised in future.

If at step 122 it was found that the selected region table for the address region including address A did not contain any invalid entry, then at step 126 the oldest valid entry (as identified by the oldest pointer 74) is selected for eviction and its contents can then be replaced with information for the new address A. The oldest pointer 74 is incremented to point to the next oldest entry. The offset for address A is written to the selected entry at step 128, and the recent table timeout values 78 for the selected region table and the other non-selected region tables are updated at step 130 the same as if an invalid entry was used for address A.

If at step 120 the victim selection circuitry 52 determined that there was no region table already allocated for an address region including the new address A, then at step 132 the victim selection circuitry 52 determines whether the address A is in an address region which already has at least a threshold number T of valid entries allocated to the potential entries table 48. T can be any integer greater than or equal to 1. In one implementation, T=1, so step 132 detects whether the potential entries table includes any existing valid entry for the same region as address A, and proceeds to step 134 if there are no existing entries from the same region. However, other examples could use a threshold T of 2 or more. If less than T of the valid addresses in the potential entries table relate to the same address region as address A then the victim selection circuitry 52 determines that the entry for address A should be allocated into the potential entries table 48. This avoids unnecessarily victimising an existing region table when there have only been relatively few accesses to a new region. At step 134 the victim selection circuitry 52 determines whether there is any invalid entry 80 in the potential entries table 48, and if so then at step 136 the next invalid entry of the potential entries table 48 is selected for use for address A. If there is no invalid entry available then at step 138 the oldest valid entry (as identified by the oldest pointer 84) is selected for eviction and the oldest pointer is incremented. Regardless of whether address A is determined to be allocated to an invalid entry or the oldest valid entry of the potential entries table 48 at steps 136 or 138, at step 140 the full address A is written to the address field 82 of the selected entry 80 of the potential entries table 48.

If at step 132 it is determined that the potential entries table 48 already includes T or more addresses in the same address region as address A, then at step 142 it is determined whether all the region tables have already been allocated for handling other regions. If not, then at step 143 the victim selection circuitry 52 simply selects the next available (free) region table for allocating to the region containing address A, and at step 156 the region base address identifying the address region comprising address A is written to the base address register 59 for the selected table. At step 158 the entries for the T other addresses in the same region containing address A are transferred from the potential entries table 48 to the region table selected at step 143, and the one or more transferred entries are marked with both the O and Y pointers 74, 76 for the selected region table. At step 160 the next entry of the selected region table is allocated for the new demand target address A which is the current training example, and the offset of address A relative to the region base address 59 is written to the offset field 58 of that selected entry. The method proceeds to step 130 to set the recent table timeout values 78 for the selected region table and any other region tables in the same way as discussed above.

If at step 142 it is determined that all region tables 46 available have already been allocated for a different address region, then one of the region tables 46 needs to be selected as a victim region table to be discarded, so that a region table can be allocated for the address region containing address A and the T other addresses previously stored in the potential entries table 48. In this case, at step 144 the victim selection circuitry 52 selects, from the region tables 46, any eligible region tables. The eligible tables include any of the region tables, other than the youngest two region tables and any table which includes a valid P delta field 66 and has a non-zero recent table timeout value 78. The youngest two region tables may be the region tables which were most recently allocated for the new regions (some tracking information can be maintained to indicate the youngest 2 region tables). In other examples a different number of youngest tables could be excluded from selection as eligible for victim selection. At step 146 the victim selection circuitry 52 determines how many eligible region tables 146 have been identified. If the number of eligible region tables is zero then at step 148 the victim selection circuitry selects the oldest (least recently allocated region table) as the victim region table. If there is only one eligible region table then at step 150 that eligible region table is selected as the victim region table. If there are two or more eligible region tables then at step 152 the oldest among those eligible region tables is selected as the victim region table. Regardless of which steps 148, 150 and 152 is performed, at step 154 the selected region table is invalidated and reallocated for use for the new address region containing address A. The method then proceeds through steps 156, 158, 160, 130 the same as discussed following step 153 described earlier.

Hence, in summary this victim selection process operates as follows. When a new region table is allocated a victim table is chosen. A simple age order is not preferred, as this may victimise useful tables that haven't had recent activity but will be useful again in favour of useless tables (recently created but only with a couple of entries that won't ever form a stream). To ensure useful tables aren't victimised, whether the table has prefetch candidates or not is taken into account. However old tables that have high confidence prefetch candidates may also be useless as they can represent demand streams that were previously useful to prefetch, but have finished and so will not occur again. The recent table timeout counter is used to decide if a potentially useful table is useful. The decision process is as follows: (a) choose which tables are eligible for victimisation (tables with prefetch candidates that have non-zero recent table timeouts are not eligible, and the youngest two tables are not eligible); (b) victimise oldest eligible table, (c) if no eligible table, victimise oldest table. The 'recent table timeout' 78 is a field associated with the region table which is set to its maximum value when we add an entry to the region table. When a training example is processed (regardless of which region it belongs to), every one of these "recent table timeout" counters 78 is decremented (other than the one belonging to the table that gets the new entry). This gives an indication of when each table was last touched by a training example. This deals with the issue that, when we have a table that has generated good prefetches in the past, but the program has now moved to a new phase, there's no more use in the streams. Here we would expect to see a table that has some high confidence streams but a 0 timeout value. For victimisation within tables (when a region table is full of entries), the least recently added entry can be selected, so that the table acts as a FIFO (first in first out) buffer.

This describes one possible victim selection algorithm, but it will be appreciated that other victim selection algorithms could also be used. Also in some implementations the potential entries table 48 may not be provided and this is not essential. If there is no potential entries table 48 then steps 132 to 140 may be omitted and in this case if the new address A is determined at step 120 to be in an address region which does not already have a region table allocated, then the method can proceed straight to step 142 to select the victim region table for allocating to the new region.

Figure 8:
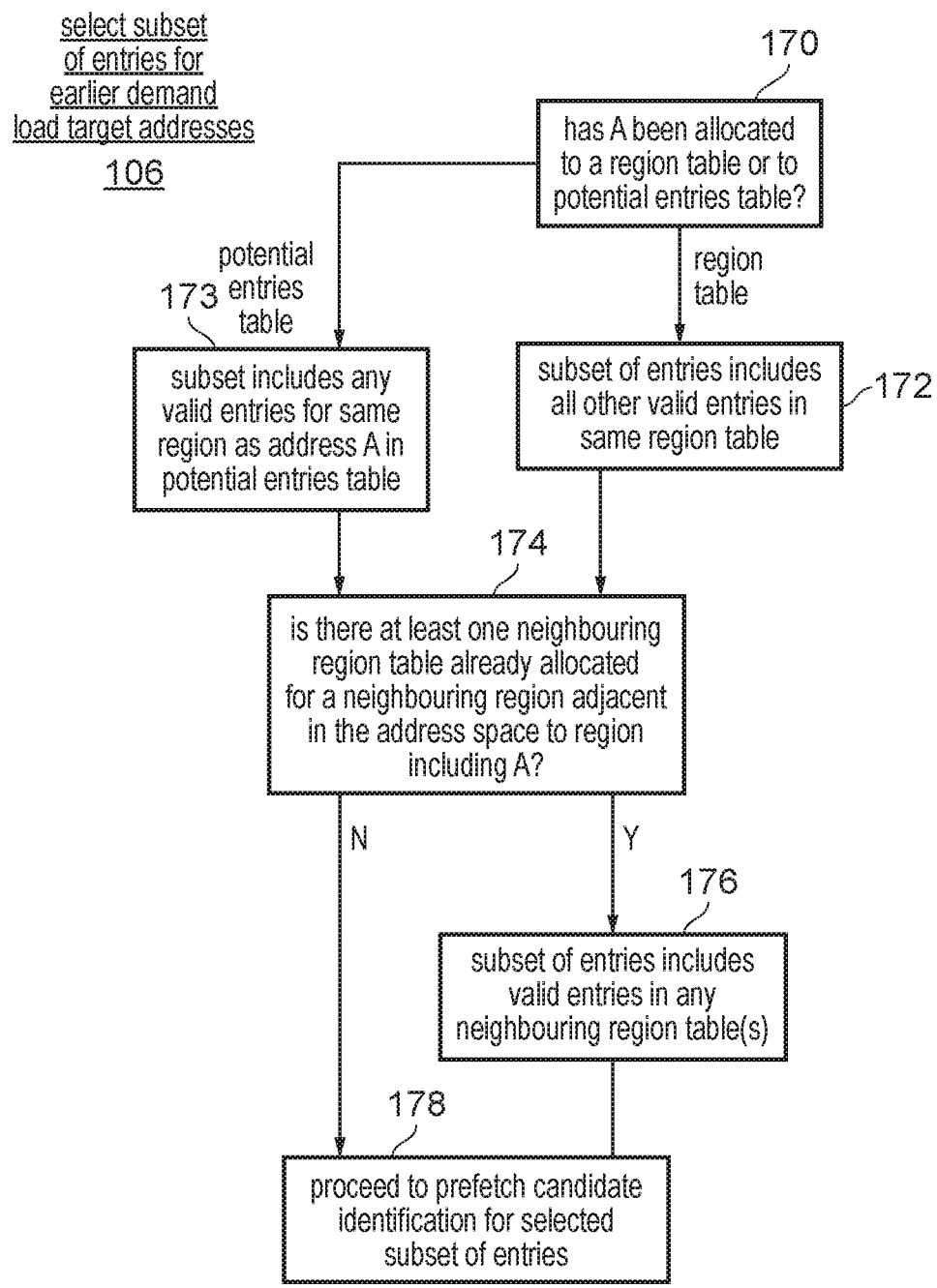
FIG. 8 is a flow diagram showing in more detail a step of FIG. 6 for selecting a subset of entries to be compared with a new demand target address provided for training.

FIG. 8 shows in more detail steps performed to select the subset of earlier entries at step 106 of FIG. 6 described above. After step 104 has selected a victim entry to be allocated for the new demand target address A, step 106 then selects a certain subset of previously allocated entries which correspond to earlier target addresses $A'_i$ to compare with the new demand target address A. At step 170, the delta analysis circuitry 50 determines whether address A has been allocated to a region table 46 or to the potential entries table 48. If the address has been allocated to a region table then at step 172 the delta analysis circuitry 50 determines that the subset of earlier entries should include at least any other valid entries within the same region table 46 as the entry allocated for address A. If address A was allocated into the potential entries table 48 (assuming a potential entries table is supported in the particular hardware implementation used) then at step 173, the subset is determined to include any valid entries of the potential entries table 48 which specify addresses in the same address region as the new address A. Note that in implementations for which the threshold T for transferring entries from the potential entries table at step 132 is 1, step 173 will never identify any other valid entries relating to the same address region, so step 173 could be omitted. However, if T≥2, step 173 can identify at least one entry to be included in the subset.

Either way, at step 174 the delta analysis circuitry 50 also determines whether there is at least one neighbouring region table already allocated for a neighbouring address region which is adjacent in the address space to the address region including address A. If there is at least one neighbouring region table, then at step 176 the subset of entries is determined to include any valid entries in the one or two neighbouring region tables. On the other hand, if there is no neighbouring region table for a neighbouring region adjacent to the address space region including address A, then step 176 is omitted. Note that sometimes it is possible that no entries are identified in the subset (if address A is the first address in a region and no neighbouring regions have been encountered yet).

Figure 9:
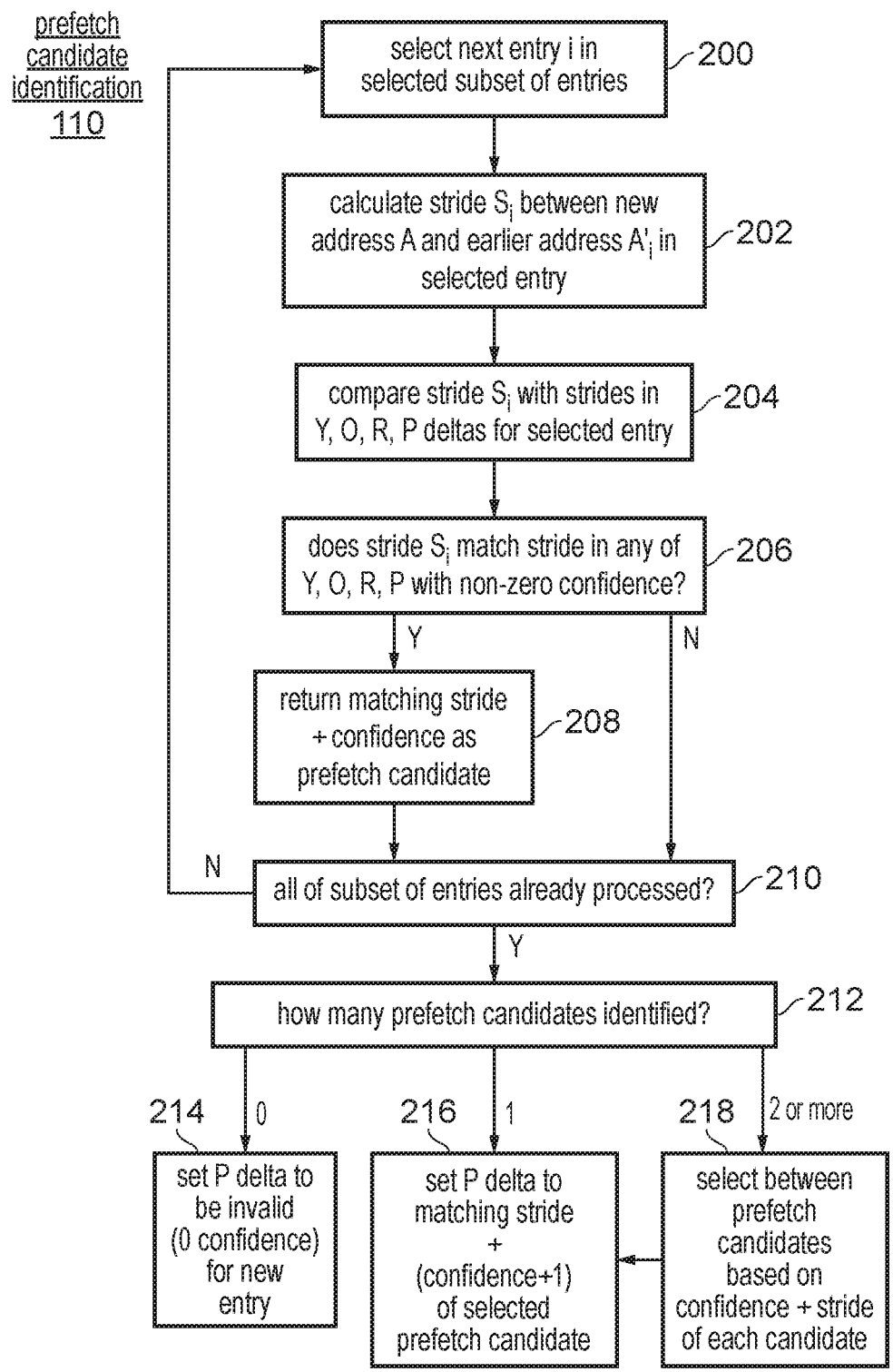
FIG. 9 is a flow diagram showing in more detail steps for identifying a prefetch candidate stride associated with the new demand target address.

Regardless of the particular subset of entries, selected at step 178 the delta analysis circuitry 50 then proceeds to prefetch candidate identification for the selected subset of entries, which continues at step 110 of FIG. 6 and which is illustrated in more detail in FIG. 9.

At step 200 of FIG. 9, the delta analysis circuitry 50 enters a loop of steps which is performed for each other entry i within the subset of entries identified at step 106. While FIG. 9 shows the steps as sequential steps in a loop, it will be appreciated that some hardware implementations could parallelise some of these operations so as to perform the comparison for different entries in the subset in parallel with each other to speed up processing. For ease of explanation, the steps are described as a loop performed iteratively for each entry, but it will be appreciated that the hardware does not necessarily operate in such a sequential manner.

Having selected the next entry i in the subset, at step 202 the delta analysis circuitry 50 calculates, as a determined stride value $S_i$, the difference between the new address A and the earlier address $A'_i$ specified in the next entry selected at step 200. At step 204 the delta analysis circuitry 50 compares the determined stride value $S_i$ with the stride value 68 in each of the delta fields 60, 62, 64, 66 for the selected entry $S_i$. At step 206 the delta analysis circuitry 50 determines whether the stride value $S_i$ matches the stride in any of the Y, O, R, P deltas 60 to 66 which has a non-confidence value 70 associated with it. Hence, matches against deltas which have a zero confidence value would not be considered a real match. If step 206 identifies a matching stride with non-zero confidence, then at step 208 that matching stride is returned, together with its confidence value 70 as obtained from the matching delta 60 to 66 of entry i, as a prefetch candidate. Then, regardless of whether there was a matching stride or not, at step 210 it is determined whether all of the subset of earlier entries selected at step 106 have already been processed and if not the method returns to step 200 to process the next entry in the subset.

Once all of the subset of entries have been processed, it is assessed at step 212 whether any prefetch candidates have been identified from the stride comparison process for each of the selected entries, and if so, how many prefetch candidates have been identified. If there are zero prefetch candidates available, then at step 214 the delta analysis circuitry 50 sets the prefetch candidate delta field 66 for the newly entry allocated entry 56, 80 for address A to be invalid, indicating a zero confidence value 70 for the prefetch candidate delta field 66 in the new entry.

If a single prefetch candidate was identified, then at step 216 the stride value 68 in the P delta field 66 of the new entry is set to match the stride value $S_i$ which matched against one of the deltas in the relevant earlier entry, and the confidence value 70 in the P delta field 66 of the newly allocated entry 56, 80 is set to be one higher than the confidence associated with the matching stride in the earlier entry. If the earlier entry already had a maximum level of confidence, then the confidence saturates at the maximum level and is not incremented further.

On the other hand, if two or more prefetch candidates were identified during the search process of steps 200 to 210, then at step 218 a selection is made between these prefetch candidates, based on the confidence associated with the matching strides identified for each prefetch candidate and based on the size of the stride values themselves. The prefetch candidates are first ranked based on confidence and if there is a single prefetch candidate with the highest confidence then it is selected as the prefetch candidate to use. If there are two or more prefetch candidates with equal highest level of confidence, then the one of those candidates which has the lowest size of the stride value $S_i$ is selected as the prefetch candidate to use. This recognises that it is more common for address sequences to have smaller stride offsets than larger ones, and also that by selecting the smallest stride it is possible that in any case continuing to step ahead in increments of the smallest stride may in any case result in addresses with a larger stride also being prefetched if they are multiples of the smaller stride. Having selected between the two or more prefetch candidates at step 218, the method continues to step 216 to set the P delta field 66 for the selected candidate in the same way as if there was only one prefetch candidate identified in the first place.

In summary, the prefetch candidate identification identifies, as the prefetch candidate, any stride with respect to an earlier entry which itself encountered the same stride value when comparing its address against even earlier entries, and the prefetch candidate stride is recorded in a newly allocated entry with increased confidence if possible, so as to gradually accumulate knowledge that it is likely that there is a stream of addresses separated at constant intervals of a certain stride value.

FIG. 9 show setting of the P delta fields in cases where step 106 identified at least one earlier entry in the subset of entries. However, if step 106 did not identify any earlier entries in the subset, then the P delta field 66 can instead be set to an invalid value (by setting the P confidence value to 0).

Figure 10:
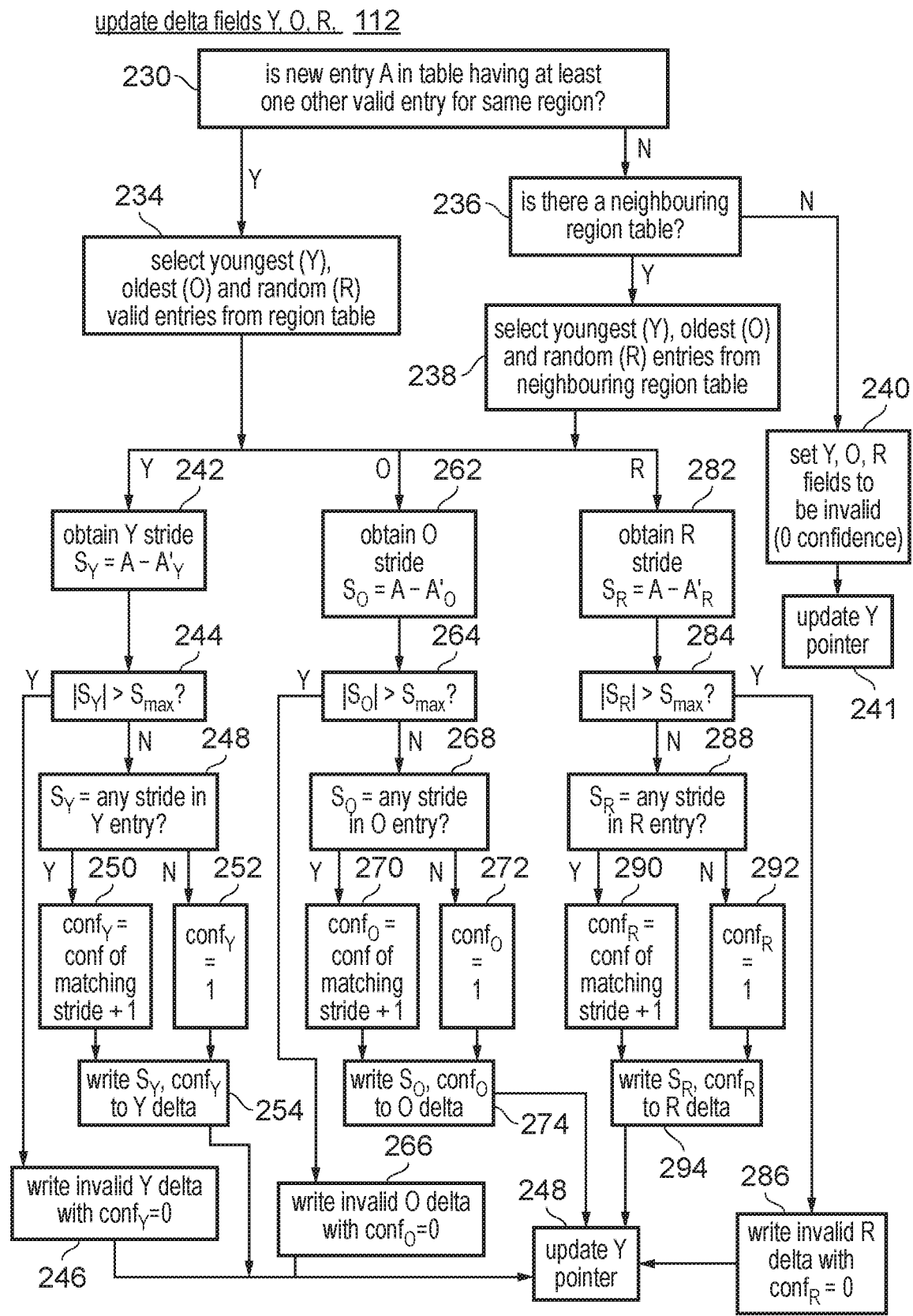
FIG. 10 shows in more detail a step of FIG. 6 for updating delta fields to be written to the new entry for the new demand target address.

FIG. 10 shows in more detail the processing at step 112 of FIG. 6 for updating the respective Y, O and R delta fields 60, 62, 64 of the entry 56, 80 of the region table 46 or the potential entries table 48 which was allocated for the new address A.

At step 230 the delta analysis circuitry 50 determines whether the new entry for address A was allocated into a table (either a region table 46 or the potential entries table 48) having at least one other valid entry for the same region containing address A. If the entry for address A was allocated into a region table 46, this will be the case if the selected region table 46 contains any other valid entry. If the entry for address A was allocated into the potential entries table 48, in implementations where the threshold T for transferring entries to the region table is equal to 1, there will never be another valid entry for the same address region as address A, as if there had been such an entry it would already have been transferred to a region table. However, in implementations where T≥2 there could be at least one valid entry in the potential entries table 48 for an address in the same address region as address A. Hence, if the table containing the entry for address A is determined to include at least one other valid entry for the same address region, at step 234 the youngest, oldest and random valid entries are selected from the same table into which address A was allocated. The youngest and oldest entries are selected based on the pointers 76, 74 respectively for the selected region table, or based on pointers 86, 84 for the potential entries table, while the random entry is selected based on a pseudo random number provided by the pseudo random number generator 54.

If the entry for address A had been allocated into a table not containing any other valid entry for the same address region as address A, then at step 236 it is determined whether there is a neighbouring region table from which the Y, O and R valid entries can be selected. If there is no such neighbouring region table then at step 240 the Y, O and R delta fields 60, 62, 64 for the new entry each set to be invalid, by specifying a zero level of confidence in those deltas, and at step 241 the youngest pointer 76, 86 for the table containing the entry for address A is updated to indicate that the new entry for address A is now the youngest entry that has been allocated into the table. On the other hand, if at step 236 at least one neighbouring region table was identified then at step 238 the youngest, oldest and random valid entries are selected from the neighbouring region table. If there are two neighbouring region tables, then an arbitrary one of these can be selected for obtaining the youngest, oldest and random entries.

Having selected which entries are to be used for referencing as the youngest, oldest and random entries according to any of steps 234 or 238, a series of steps are then performed separately for each of these entries. Steps 242 to 254 of FIG. 10 illustrate processing performed for the youngest (Y) entry selected at step 234 or 238.

At step 242 the delta analysis circuitry 50 obtains a Y stride value $S_Y$ which corresponds to the difference between the new address A and the address $A'_Y$ which is represented in the address field 58 of the entry selected as the youngest entry. At step 244 the delta analysis circuitry 50 determines whether an absolute value of the Y stride value $S_Y$ is greater than a maximum stride value $S_{max}$, which may correspond to the maximum value which is able to be represented in the delta field 60 of a given entry, given the limited number of bits available in each delta field. If the absolute value of the Y stride value $S_Y$ is greater than the maximum permitted value, then at step 246 an invalid Y delta field is written to the new entry for address A, with a zero level of confidence specified. To avoid needing to have extremely large delta value fields it may be preferable to simply forego the ability to record extremely large stride values and instead record only stride values which are within a certain range, as it may be relatively rare that useful stride patterns of address accesses are detected with a very large stride value anyway. For example, the stride field 68 of a given delta value could only have a relatively small number of bits such as 4, 8 or 16 and so the maximum value may be set accordingly.

If the youngest stride value $S_Y$ is within range, then at step 248 it is determined whether $S_Y$ matches any of the strides specified in any of the delta fields 60, 62, 64, 66 in the entry selected as the youngest entry. If not, then at step 252 the confidence value for the determined stride value $S_Y$ is determined as equal to 1. If $S_Y$ did match any stride in the youngest entry, then at step 250 the associated confidence is set to be 1 higher than the confidence associated with the matching stride in the youngest entry. Again, if the confidence for the matching stride is already at the maximum value then a further 1 is not added and the confidence saturates at that highest level. Regardless of which of steps 250 and 252 are performed, at step 254 the youngest stride value $S_Y$ and the associated confidence level are written to the Y delta field 60 of the entry allocated for address A.

Regardless of whether the Y delta field is set at step 246 or 254, at step 248 the youngest pointer 76, 86 for the new entry is updated to mark the newly allocated entry as the youngest allocated entry.

Similarly, in respect of the entries selected as the oldest entry and the random entry at step 234 or 238 a similar set of steps are performed compared to the youngest entry. Steps 262 to 274 are performed for the oldest entry in the same way as steps 242 to 254 for the youngest entry. Steps 282 to 294 are performed for the random entry in the same way as steps 242 to 254 respectively for the youngest entry. The steps for each of the Y, O and R delta field setting can be done in parallel with each other. Regardless of which entry is being referenced for the setting of the delta fields, the Y pointer only needs to be updated once at step 248.

Hence, the delta updates record a subset of the strides with respect to earlier entries, with that subset being selected to include the strides with reference the youngest, oldest and randomly selected entries, which tends to increase the prediction ability achievable using only a limited amount of storage and comparison logic overhead.

Figure 11:
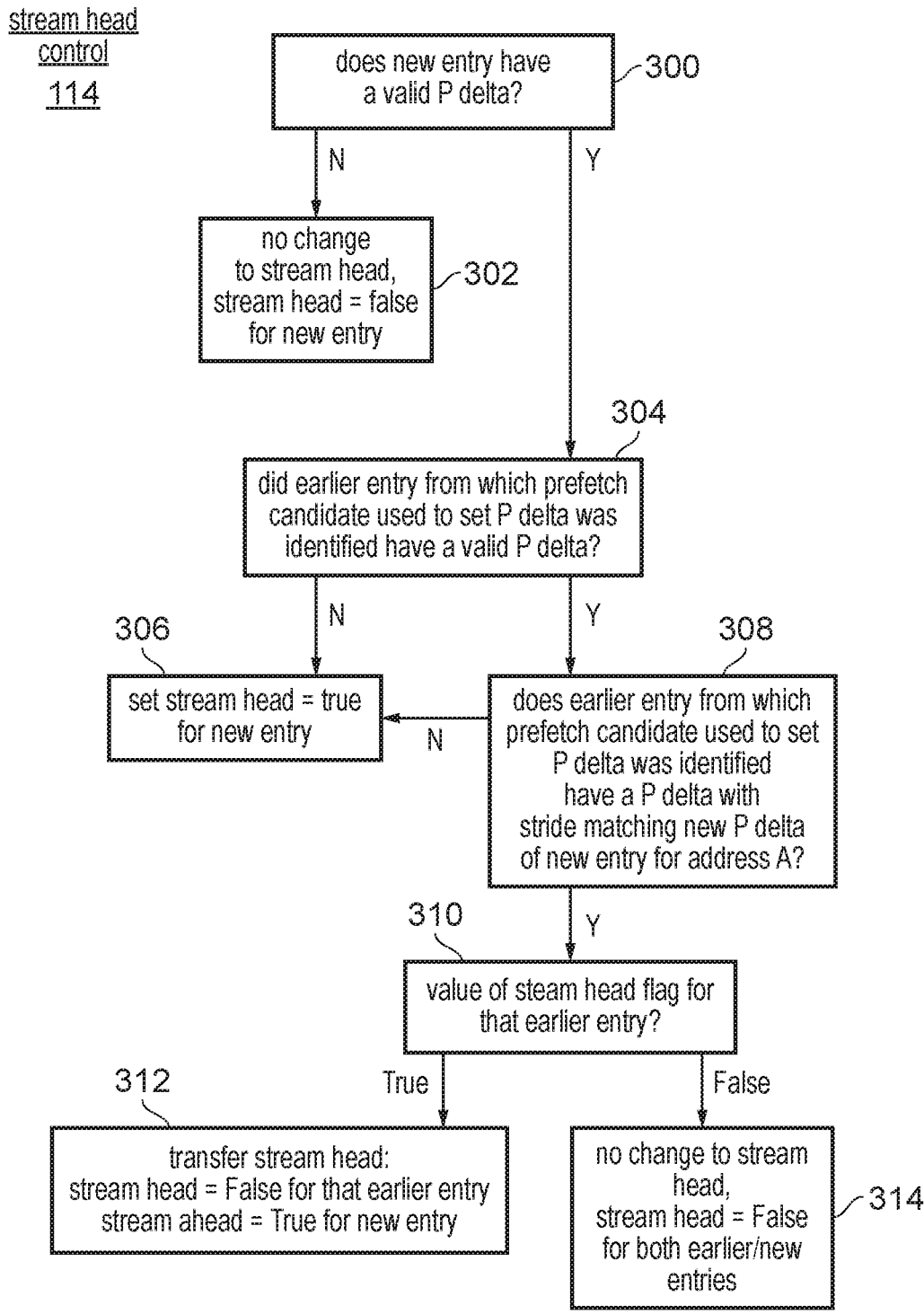
FIG. 11 is a flow diagram showing a step of FIG. 6 for determining whether the new entry for the demand target address should be marked as corresponding to a head of a stream of addresses corresponding to a constant stride sequence.
Figure 12:
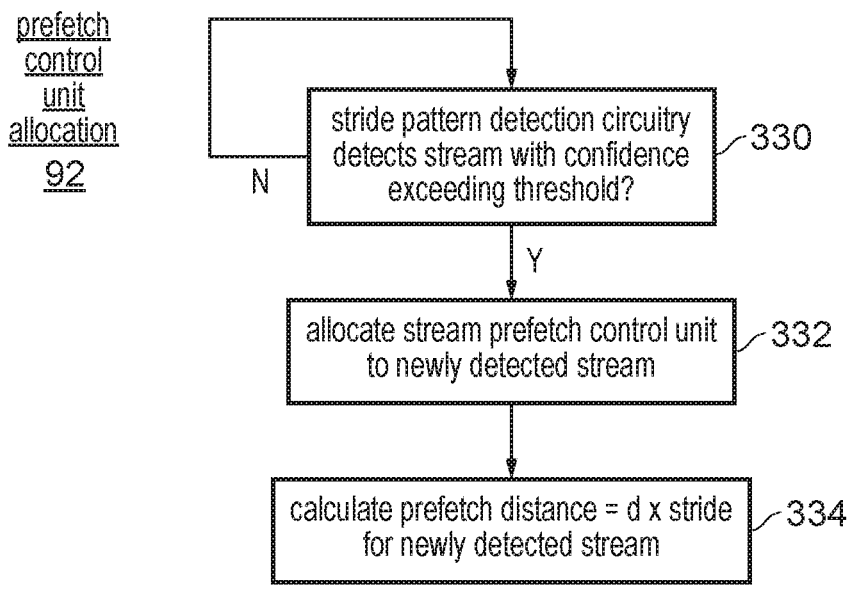
FIG. 12 is a flow diagram showing in more detail a step of FIG. 5 for allocating a prefetch control unit for controlling prefetching according to one of the constant stride sequences of addresses detected by the stride pattern detection circuitry.

FIG. 11 is a flow diagram showing in more detail step 114 for determining whether to set or transfer the stream head for the new entry for demand target address A. At step 300 the delta analysis circuitry 50 determines whether the newly allocated entry for address A has a valid P delta field (with non-zero confidence) 66. If the new entry does not have a valid P delta field 66 then at step 302 it is determined that no change to the stream head is needed and the stream head indication 72 for the new entry is set to indicate false. If the new entry does have a valid P delta field 66 then at step 304 the delta analysis circuitry determines whether the earlier entry from which the prefetch candidate was taken was identified as itself having a valid P delta field 66. If not, then this new entry represents the start of a newly detected stream of addresses and so the stream head indication 72 is set to true for that new entry, without removing or changing any stream head indications in other entries.

If at step 304 it was determined that the earlier entry from which the prefetch candidate was taken does have a valid P delta, then at step 308 the delta analysis circuitry 50 determines whether the earlier entry from which the prefetch candidate was taken specifies a P delta field 66 having a stride value 68 matching the stride value for the P delta field 66 in the new entry. If not, again the method proceeds to step 306 because as the strides do not match then this new entry represents a different stream compared to the stream identified in the earlier entry.

However, if at step 308 the stride for the prefetch candidate in the earlier entry matches the earlier stride for the prefetch candidate in the new entry then at step 310 the delta analysis circuitry 50 determines the value of the stream head flag for that earlier entry. If the value of the stream head flag for the earlier entry is true, then the new entry represents a continuation of the stream of constant stride addresses already identified from that earlier entry and so the stream head indication is transferred from the earlier entry to the new entry, so that the stream head indication becomes false for that earlier entry and becomes true for the new entry. On the other hand if the value of the stream head flag for the earlier entry was false at step 310, then at step 314 there is no change to the stream head and the stream head indication remains false for both earlier and new entries. The latter case at step 214 recognises that if the earlier entry matched the stride but was not itself identified as a stream head, that means there was also another address seen which is further ahead in the stream than the earlier entry, so the stream head may lie elsewhere.

Hence, the stride detection training process is summarised in FIGS. 6 to 11 discussed above. In summary, this training process can be described as follows:

Calculate the stride between A and other valid addresses in the entry region table and the neighbour region table (where those tables existed)

For each entry in the entry and neighbour region tables (with address A'), identify prefetch candidates:
Take the calculated stride S (=A–A')
If A' entry has a delta with a matching stride and non-zero confidence this becomes a prefetch candidate Choose the prefetch candidate that has the highest confidence
If several have the highest confidence choose lowest stride Write the chosen prefetch candidate in the P column of the new row (with confidence increased by 1)

Fill in the Y, and R columns of the new row: for each we choose a row to look at, giving us address $A_C$:
For Y look at the youngest entry
For O look at the oldest entry
For R look at a random entry
Y, O, R come from the entry region table if it exists, otherwise from the neighbour region table For each of Y, O, R:
Take the stride between new and chosen entry (S=A–$A_c$)
If stride S matches a delta in the Ac row:
Write a delta in Y, O or R (as appropriate) with that stride and confidence of matching delta+1
If stride S does not match a delta in the $A_c$ row:
Write a delta in the Y, O or R (as appropriate) with that stride and a confidence of 1
If stride between training example and Y, O or R outside range, or if Y, O or R do not give us an entry (because we don't have an entry region or neighbour region table):
Write a zero confidence delta in the Y, O or R (as appropriate) column, stride is irrelevant for 0 confidence delta If new entry has a valid P delta:
If the entry it came from (the P parent) had no valid P delta set the stream head flag
If the P parent has a valid P delta and its P delta stride matches new P delta stride, inherit the stream head flag (if it was true, set to false and set new flag to true, otherwise both remain false).
If the P parent has a valid P delta and its P delta stride is different from the new P delta stride, set the stream head flag Returning to FIG. 5, step 92 discussed above shows allocation of a prefetch control unit 90 in the prefetch control circuitry 44 for processing a given constant stride sequence identified through the training of the stride pattern detection circuitry 42. Step 92 of FIG. 5 is shown in more detail in FIG. 12. At step 330 the stride pattern detection circuitry 42 detects whether a constant stride sequence has been detected with a level of confidence exceeding a certain confidence threshold. That is, the stride pattern detection circuitry detects whether there is a region in the region table for which a prefetch candidate has been identified and for which the associated confidence value for the prefetch candidate field 66 has exceeded some level of confidence. If so, then at step 332 a prefetch control unit 90 is allocated for the newly detected stream (invalidating any information for a previously allocated stream if there is no available prefetch control unit already). At step 334 the allocated prefetch control unit calculates the prefetch distance 97 for the newly detected stream, by multiplying the stride value 96 provided by the stride pattern detection circuitry 42 for that stream by a predetermined distance multiple D. The calculated prefetch distance 97 may be written to a register or alternatively could be calculated on the fly based on the stride value 96 each time the distance is needed.

Figure 13:
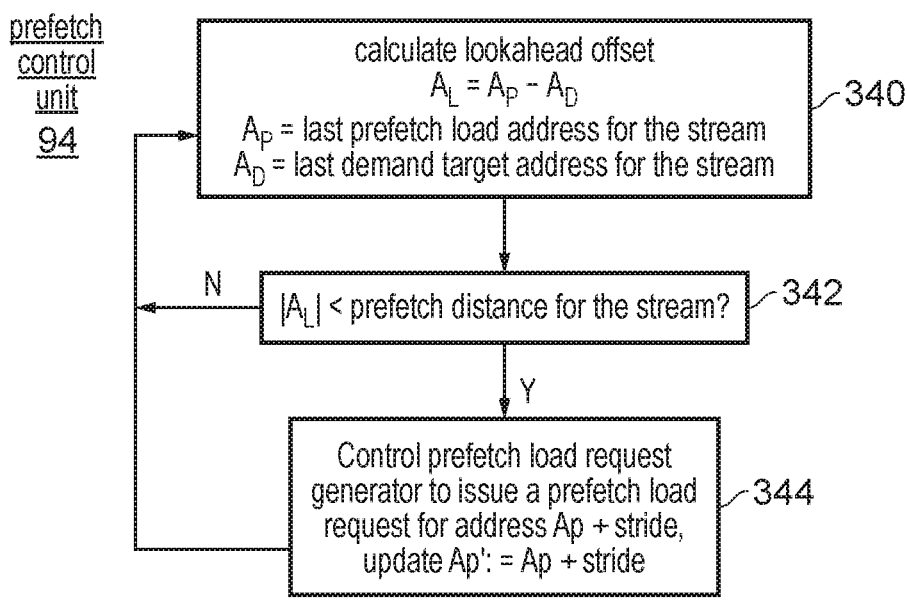
FIG. 13 is a flow diagram showing in more detail a step of FIG. 5 for controlling issuing of prefetch load requests based on one of the constant stride sequences detected by the stride pattern detection circuitry.

Step 94 of FIG. 5 shows a step of controlling issuing of prefetch load requests for a given constant stride sequence, and this step is shown in more detail in FIG. 13. The steps of FIG. 13 may be performed as an independent control algorithm for each individual constant stride sequence which is detected as being interleaved in the sequence of demand target addresses, based on the prefetch distance 97 identified for that constant stride sequence of addresses. At step 340 the stream prefetch control unit 90 calculates a look ahead offset $A_L$ as a difference between the last prefetch load address 99, $A_P$, and the last demand target address 98, $A_D$. At step 342 the prefetch control unit 90 determines whether an absolute value of the look ahead offset $A_L$ is less than the prefetch distance 97 determined for the corresponding stream (constant stride sequence) and if not then no further prefetch requests are issued (that is, no prefetching is performed if the look ahead offset is greater than the prefetch distance). If at step 342 the absolute value of the look ahead offset is determined to be less than the prefetch distance then at step 344 the stream prefetch control unit 90 controls the prefetch load request generator 94 to issue at least one prefetch load request for an address ($A_P$+stride) where "stride" is the stride value 96 determined for the corresponding stream. Also, the last prefetch load address 99 $A_P$ is updated by adding the stride and writing the result back to the last prefetch load address register 99. The method then returns to step 340 to continue comparing the look ahead offset with the prefetch distance, and so over time the prefetch request will continue to remain a set distance ahead of the last seen demand target address for the corresponding stream. Here, the last seen demand target address corresponds to the address marked as the head of the stream in the region tables maintained by the stride pattern detection circuitry for the corresponding stream.

Hence, in summary, the approach discussed above is able to detect more complex patterns of address accesses, where a sequence with varying strides between successive addresses can be decomposed into a number of individual sequences of constant stride offsets, and this provides a more efficient prefetch hardware unit which is still able to detect more complex access patterns.

A worked example of this process is shown in FIG. 14. Consider a stride pattern of +1, +2, +3 as discussed earlier, with addresses 0, 1, 3, 6, 7, 9, 12, 13, etc. After the first 3 addresses of this pattern we have a region table as shown in part A) of FIG. 14. Looking at entry 3 we have a (Y)oung delta of (+2, 1), because 3−1=2 and the youngest entry for address 1 has no +2 delta (so confidence of 1). Similarly, for the (O)ldest delta in entry 3, we calculate 3−0=+3 relative to the address of the oldest entry for address 0, and again as there is no matching delta in the entry for address 0, we record a confidence of 1. In this example, the (R)andomly chosen entry for address 3 was the entry for address 1, so the R delta is the same as the Y delta for this particular example (but on other occasions the entry for address 0 may have been chosen). No prefetch candidate has yet been set for address 3, because the stride between 3 and the previous entries does not match any of the strides in the deltas of those previous entries.

Part B) of FIG. 14 shows the next step when a new entry is allocated for address 6 in the sequence. The Y and 0 deltas are set relative to entries 3 and 0 respectively, and this time the random selection uses entry 1 for generating the R delta. This time, we have a prefetch candidate as, for the Y delta relative to address 3, 6−3=3 and entry 3 has an 0 delta of (+3, 1), giving us a +3, 2 prefetch candidate. Stream head becomes true as 6 is the top of the +3 stream just detected.

Part C) of FIG. 14 shows the next step when the entry for address 7 is added. 7 is not part of the +3 stream just detected. The random selection for address 7 chooses entry 1, giving it (+6, 1) for the (R)andom delta. It has no prefetch candidate and so is not a stream head.

Part D) of FIG. 14 shows the next step when the entry for address 9 is added. This time the random selection selects entry 3. 9 is part of the +3 stream continuing from 6. As all of the strides with respect to earlier entries are calculated (even for an entry 6 which is not selected as Y, O or R), the match between the 9−6=+3 stride for entry 6 and the Y and prefetch candidate strides of +3, 2 is detected, and so a P delta of (+3, 3) is set for entry 9 and this entry inherits the stream head status.

Part E) of FIG. 14 shows the next step when the address 12 is added to the table. 12 continues the +3 stream, so gets a +3, 4 (P)refetch candidate and inherits the stream head status.

Part F) of FIG. 14 shows the next step when the address 13 is added to the table. 13 is part of the +6 stream detected at 6. None of the Y, O, R delta heuristics detect the +6 stride here, however because (P)refetch candidate looks at all strides between previous entries we observe 13−7=6 and entry 7 has a +6, 1 delta, resulting in a +6, 2 (P)refetch candidate and entry 13 gaining stream head status.

At this point we have successfully detected both the +3 and +6 streams that will prefetch the whole address pattern. Prefetchers would be assigned to the 12 and 13 stream heads.

Hence, this example shows how the technique discussed above can detect interleaved constant stride sequences within a more complex sequence of addresses including a cyclic variation of strides.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to issue demand memory access requests to access data stored in a memory system;
stride pattern detection circuitry to detect whether a sequence of demand target addresses specified by the demand memory access requests issued by the processing circuitry includes a plurality of constant stride sequences of addresses interleaved within the sequence of demand target addresses and decompose the sequence of demand target addresses into said plurality of constant stride sequences, each constant stride sequence comprising successive addresses separated by intervals of a constant stride value throughout the constant stride sequence; and
prefetch control circuitry to control issuing of prefetch load requests to prefetch data from the memory system, the prefetch load requests specifying prefetch target addresses predicted based on the plurality of constant stride sequences detected by the stride pattern detection circuitry; wherein:
the prefetch control circuitry is configured to control issuing of the prefetch load requests, based on a separate prefetch control algorithm for each of the plurality of constant stride sequences identified by the stride pattern detection circuitry;
the stride pattern detection circuitry is configured to maintain at least one training table comprising a plurality of entries, each entry to identify a given demand target address within the sequence of demand target addresses; and
in response to receipt of a new demand target address in the sequence of demand target addresses, the stride pattern detection circuitry is configured to perform a stride comparison process for each of a subset of one or more earlier entries of the at least one training table;
the stride comparison process for a given earlier entry comprising:
comparing a plurality of delta values specified in the given earlier entry with a determined stride value determined based on a difference between the new demand target address and the given demand target address specified by the given earlier entry, the plurality of delta values each specifying a difference between the given demand target address and an earlier demand target address in the sequence of demand target addresses, wherein the plurality of delta values correspond to different earlier demand target addresses.

2. The apparatus according to claim 1, in which when the stride pattern detection circuitry detects that the sequence of demand target addresses includes said plurality of constant stride sequences interleaved in the sequence of demand target addresses:
the prefetch control circuitry is configured to control issuing the prefetch load requests based on respective prefetch distances determined separately for each of the constant stride sequences.

3. The apparatus according to claim 1, in which when the stride pattern detection circuitry detects that a level of confidence in a prediction that the sequence of demand target addresses includes a constant stride sequence corresponding to a given constant stride value exceeds a confidence threshold, the stride pattern detection circuitry is configured to control the prefetch control circuitry to start issuing of prefetch load requests for prefetch target addresses predicted based on the given constant stride value.

4. The apparatus according to claim 1, in which
the stride comparison process for a given earlier entry comprises:
when the determined stride value matches one of the plurality of delta values of the given earlier entry, increasing a level of confidence associated with a prediction that the new demand target address is a member of a constant stride sequence of demand target addresses separated at intervals of a constant stride value matching said determined stride value.

5. The apparatus according to claim 4, in which said subset of one or more earlier entries comprises one or more earlier entries for which the given demand target address is in a same address region as the new demand target address or in a neighbouring address region to the address region comprising the new demand target address, where each address region comprises a block of addresses of a predetermined size.

6. The apparatus according to claim 1, in which the plurality of delta values comprises an oldest delta value specifying a difference between the given demand target address and an oldest earlier demand target address in the sequence of demand target addresses which lies within one of: a given address region including the given demand target address, and a neighbouring address region to the given address region, where each address region comprises a block of addresses of a predetermined size.

7. The apparatus according to claim 1, in which the plurality of delta values comprises a youngest delta value specifying a difference between the given demand target address and a youngest earlier demand target address in the sequence of demand target addresses which lies within one of: a given address region including the given demand target address, and a neighbouring address region to the given address region, where each address region comprises a block of addresses of a predetermined size.

8. The apparatus according to claim 1, in which the plurality of delta values comprises a random delta value specifying a difference between the given demand target address and a randomly selected earlier demand target address in the sequence of demand target addresses which lies within one of: a given address region including the given demand target address, and a neighbouring address region to the given address region, where each address region comprises a block of addresses of a predetermined size.

9. The apparatus according to claim 1, in which the plurality of delta values comprises a prefetch candidate delta value specifying a difference between the given demand target address and an earlier demand target address specified in a matching entry detected as specifying at least one delta value matching the difference between the given demand target address and the earlier demand target address of the matching entry.

10. The apparatus according to claim 1, in which each entry also comprises a stream head indication of whether the given demand target address is detected to be a latest demand target address in one of said plurality of constant stride sequences.

11. The apparatus according to claim 1, in which the at least one training table comprises a plurality of region tables each associated with a corresponding address region in an address space used to define the demand target addresses, where each address region comprises a block of addresses of a predetermined size.

12. The apparatus according to claim 11, in which each region table is associated with a base address storage element to store a base address of the corresponding address region; and
each entry in a given region table specifies the given demand target address as an offset relative to the base address stored in the base address storage element associated with the given region table.

13. The apparatus according to claim 11, in which the at least one training table also comprises a potential entries table; and
when encountering a new demand target address from a new address region for which no region table has yet been allocated:
when less than a threshold number of valid entries in the potential entries table specify an address from the new address region, the stride pattern detection circuitry is configured to allocate an entry in the potential entries table for the new demand target address; and
when a number of valid entries in the potential entries table specifying an address from the new address region is greater than or equal to the threshold number, the stride pattern detection circuitry is configured to allocate a new region table for use for addresses in the new address region, to transfer at least one valid entry for another address in the new address region from the potential entries table to the new region table, and to allocate an entry in the new region table for the new demand target address.

14. The apparatus according to claim 1, in which the stride pattern detection circuitry is configured to filter which demand target addresses in the sequence of demand target addresses are used to train detection of the plurality of constant stride sequences.

15. The apparatus according to claim 14, in which the stride pattern detection circuitry is configured to exclude from training a cache-hitting demand target address of the sequence of demand target addresses,
said cache-hitting demand target address comprising an address which hits in a predetermined level of cache and which does not fit within an already detected constant stride sequence.

16. An apparatus comprising:
means for issuing demand memory access requests to access data stored in a memory system;
means for detecting whether a sequence of demand target addresses specified by demand memory access requests issued by the means for issuing demand memory access requests includes a plurality of constant stride sequences of addresses interleaved within the sequence of demand target addresses and decomposing the sequence of demand target addresses into said plurality of constant stride sequences, each constant stride sequence comprising successive addresses separated by intervals of a constant stride value throughout the constant stride sequence; and
means for controlling issuing prefetch load requests to prefetch data from the memory system, the prefetch load requests specifying prefetch target addresses predicted based on the plurality of constant stride sequences detected by the means for detecting, wherein:

the means for controlling issuing prefetch load requests is configured to control issuing of the prefetch load requests, based on a separate prefetch control algorithm for each of the plurality of constant stride sequences identified by the means for detecting;

the means for detecting is configured to maintain at least one training table comprising a plurality of entries, each entry to identify a given demand target address within the sequence of demand target addresses; and in response to receipt of a new demand target address in the sequence of demand target addresses, the means for detecting is configured to perform a stride comparison process for each of a subset of one or more earlier entries of the at least one training table;

the stride comparison process for a given earlier entry comprising:
  comparing a plurality of delta values specified in the given earlier entry with a determined stride value determined based on a difference between the new demand target address and the given demand target address specified by the given earlier entry, the plurality of delta values each specifying a difference between the given demand target address and an earlier demand target address in the sequence of demand target addresses, wherein the plurality of delta values correspond to different earlier demand target addresses.

17. A method comprising:
issuing demand memory access requests to access data stored in a memory system;

detecting whether a sequence of demand target addresses specified by issued demand memory access requests includes a plurality of constant stride sequences of addresses interleaved within the sequence of demand target addresses;

decomposing the sequence of demand target addresses into said plurality of constant stride sequences, each constant stride sequence comprising successive addresses separated by intervals of a constant stride value throughout the constant stride sequence; and controlling issuing prefetch load requests to prefetch data from the memory system, the prefetch load requests specifying prefetch target addresses predicted based on the plurality of constant stride sequences, wherein:

the issuing of the prefetch load requests is controlled based on a separate prefetch control algorithm for each of the plurality of constant stride sequences identified by the stride pattern detection circuitry;

the detecting of constant stride sequences is controlled based on at least one training table comprising a plurality of entries, each entry to identify a given demand target address within the sequence of demand target addresses; and in response to receipt of a new demand target address in the sequence of demand target addresses, performing a stride comparison process for each of a subset of one or more earlier entries of the at least one training table;

the stride comparison process for a given earlier entry comprising:
  comparing a plurality of delta values specified in the given earlier entry with a determined stride value determined based on a difference between the new demand target address and the given demand target address specified by the given earlier entry, the plurality of delta values each specifying a difference between the given demand target address and an earlier demand target address in the sequence of demand target addresses, wherein the plurality of delta values correspond to different earlier demand target addresses.

* * * * *